(12) United States Patent
Landis et al.

(10) Patent No.: US 11,616,555 B2
(45) Date of Patent: Mar. 28, 2023

(54) SPATIAL MISALIGNMENT TRACKING FOR ORBITAL ANGULAR MOMENTUM BEAMS IN MILLIMETER WAVE AND HIGHER FREQUENCY BANDS

(71) Applicant: QUALCOMM Incorporated, San Diego, CA (US)

(72) Inventors: Shay Landis, Hod Hasharon (IL); Ran Berliner, Kfar-Aviv (IL); Yehonatan Dallal, Kfar Saba (IL); Assaf Touboul, Netanya (IL); Idan Michael Horn, Hod Hasharon (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/351,883

(22) Filed: Jun. 18, 2021

(65) Prior Publication Data

US 2022/0407579 A1    Dec. 22, 2022

(51) Int. Cl.
*H04B 7/06*    (2006.01)
*H04L 7/00*    (2006.01)
(Continued)

(52) U.S. Cl.
CPC ........... *H04B 7/0639* (2013.01); *H04B 7/043* (2013.01); *H04B 17/309* (2015.01); *H04L 7/0016* (2013.01)

(58) Field of Classification Search
CPC .... H04B 17/309; H04B 7/043; H04B 7/0016; H04L 7/0016
See application file for complete search history.

(56) References Cited

U.S. PATENT DOCUMENTS

| 8,432,884 B1* | 4/2013 | Ashrafi | H04J 1/08 |
| | | | 370/343 |
| 8,743,984 B2* | 6/2014 | Djordjevic | H04L 27/2096 |
| | | | 375/267 |

(Continued)

FOREIGN PATENT DOCUMENTS

| CN | 110266354 A | 9/2019 |
| EP | 3567783 A1 | 11/2019 |

(Continued)

OTHER PUBLICATIONS

Chen, et al., "Spectral and Energy Efficiency of Line-of-Sight OAM-MIMO Communication Systems" China Communications, China Institute of Communications, Piscataway, NJ, USA, vol. 17, No. 9, Sep. 1, 2020, pp. 119-127 [retrieved Sep. 25, 2020].

(Continued)

*Primary Examiner* — James M Perez
(74) *Attorney, Agent, or Firm* — Procopio, Cory, Hargreaves & Savitch LLP/Qualcomm Incorporated

(57) ABSTRACT

Apparatus, methods, and computer-readable media are disclosed herein for facilitating spatial misalignment tracking for OAM beams in millimeter wave and higher frequency bands. An example method for wireless communication at a first communication device includes receiving, from a second communication device, a first misalignment tracking RS and a second misalignment tracking RS for an OAM transmission. The example method also includes determining a misalignment based on the first misalignment tracking RS, the second misalignment tracking RS, and using a subset of antenna elements of an antenna array of the first communication device. Additionally, the example method includes adjusting reception of a subsequent OAM transmission from the second communication device at the antenna array of the first communication device.

47 Claims, 19 Drawing Sheets

(51) Int. Cl.
*H04B 17/309* (2015.01)
*H04B 7/0426* (2017.01)

(56) References Cited

U.S. PATENT DOCUMENTS

| | | | | |
|---|---|---|---|---|
| 9,031,151 B1* | 5/2015 | Harris | H04B 7/0617 | 375/267 |
| 9,077,577 B1* | 7/2015 | Ashrafi | H04L 27/366 | |
| 9,379,926 B2* | 6/2016 | Berretta | H04L 5/04 | |
| 9,838,128 B1* | 12/2017 | Rusch | G02B 6/34 | |
| 10,371,508 B1* | 8/2019 | Ulander | H04B 10/112 | |
| 11,088,752 B1* | 8/2021 | Klemes | H04L 27/2654 | |
| 11,115,962 B2* | 9/2021 | Kang | H04W 72/0413 | |
| 11,139,867 B2* | 10/2021 | Sasaki | H04B 7/0417 | |
| 11,170,318 B2* | 11/2021 | Ashrafi | G02F 3/00 | |
| 11,202,211 B2* | 12/2021 | Sasaki | H04B 7/0469 | |
| 11,202,335 B2* | 12/2021 | Ashrafi | H04B 7/0871 | |
| 11,228,363 B2* | 1/2022 | Sasaki | H04B 7/086 | |
| 11,283,522 B2* | 3/2022 | Ashrafi | H04B 10/541 | |
| 11,342,976 B1* | 5/2022 | Dallal | H01Q 21/20 | |
| 11,368,198 B2* | 6/2022 | Hirabe | H04B 17/309 | |
| 2003/0137645 A1* | 7/2003 | Fluckiger | G01S 7/4802 | 356/4.01 |
| 2005/0239426 A1* | 10/2005 | Berretta | H04B 1/406 | 455/227 |
| 2009/0227252 A1* | 9/2009 | Fenech | H04B 7/2041 | 455/429 |
| 2010/0073260 A1* | 3/2010 | Fujita | H01Q 25/008 | 343/700 R |
| 2012/0295538 A1* | 11/2012 | Arcidiacono | H04B 7/185 | 455/12.1 |
| 2012/0307933 A1* | 12/2012 | Djordjevic | H04L 27/3411 | 375/295 |
| 2013/0027034 A1* | 1/2013 | Elgort | G01R 33/26 | 324/301 |
| 2013/0235885 A1* | 9/2013 | Chen | H04L 27/2697 | 370/468 |
| 2013/0285853 A1* | 10/2013 | Lee | H04W 24/08 | 342/368 |
| 2014/0016181 A1* | 1/2014 | Dal Negro | G02B 5/008 | 264/1.36 |
| 2014/0199066 A1* | 7/2014 | Martelli | H04B 10/2581 | 398/44 |
| 2014/0205283 A1* | 7/2014 | Djordjevic | H04B 10/516 | 398/44 |
| 2014/0348423 A1* | 11/2014 | Ishiga | G06T 7/90 | 382/165 |
| 2015/0030280 A1* | 1/2015 | Alu | G02F 1/011 | 359/484.01 |
| 2015/0055961 A1* | 2/2015 | Meyers | G06N 10/00 | 398/140 |
| 2015/0084636 A1* | 3/2015 | Popescu | G01R 33/34 | 324/322 |
| 2015/0146815 A1* | 5/2015 | Berretta | H04L 27/18 | 375/279 |
| 2015/0194735 A1* | 7/2015 | Graceffo | H01Q 21/28 | 359/853 |
| 2015/0304152 A1* | 10/2015 | Chen | H04L 47/82 | 375/299 |
| 2015/0357710 A1* | 12/2015 | Li | H01Q 21/065 | 342/174 |
| 2016/0043794 A1* | 2/2016 | Ashrafi | H04L 27/2017 | 370/329 |
| 2016/0044647 A1* | 2/2016 | Ashrafi | H04L 27/2601 | 370/330 |
| 2016/0254897 A1* | 9/2016 | Berretta | H04W 72/0446 | 375/267 |
| 2016/0292472 A1* | 10/2016 | Tamburini | G06K 7/10316 | |
| 2017/0026095 A1* | 1/2017 | Ashrafi | H04B 7/10 | |
| 2017/0126460 A1* | 5/2017 | Dutronc | H04L 5/0048 | |
| 2017/0181183 A1* | 6/2017 | Sung | H04B 7/0695 | |
| 2017/0187442 A1* | 6/2017 | Luddy | H04B 7/0632 | |
| 2017/0331532 A1* | 11/2017 | Le-Ngoc | H04B 7/0617 | |
| 2017/0353265 A1* | 12/2017 | Mansouri Rad | H04B 10/2581 | |
| 2018/0026817 A1* | 1/2018 | Graceffo | H04L 27/20 | 375/308 |
| 2018/0234285 A1* | 8/2018 | Djordjevic | H04L 27/345 | |
| 2019/0020434 A1* | 1/2019 | Adachi | H04J 11/00 | |
| 2019/0028165 A1* | 1/2019 | Adachi | H01Q 3/36 | |
| 2019/0149251 A1* | 5/2019 | Zenkyu | H01Q 15/0013 | 375/262 |
| 2019/0165837 A1* | 5/2019 | Son | H04B 17/12 | |
| 2019/0165849 A1* | 5/2019 | Ashrafi | H04B 7/0671 | |
| 2019/0198999 A1* | 6/2019 | Ashrafi | H01Q 25/04 | |
| 2019/0334609 A1* | 10/2019 | Alavi | H01Q 3/34 | |
| 2020/0127709 A1* | 4/2020 | Klemes | H04L 25/03343 | |
| 2020/0127729 A1* | 4/2020 | Klemes | H04B 7/0606 | |
| 2020/0228195 A1* | 7/2020 | Sasaki | H01Q 21/20 | |
| 2020/0296599 A1* | 9/2020 | Sasaki | H04B 7/0617 | |
| 2020/0313307 A1* | 10/2020 | Lee | H04B 7/0456 | |
| 2020/0388935 A1* | 12/2020 | Lee | H01Q 21/061 | |
| 2021/0028965 A1* | 1/2021 | Dutronc | H04L 27/2334 | |
| 2021/0058118 A1* | 2/2021 | Sasaki | H04B 7/0848 | |
| 2021/0084640 A1* | 3/2021 | Kang | H04B 7/00 | |
| 2021/0211168 A1* | 7/2021 | Sasaki | H04B 7/0456 | |
| 2021/0288699 A1* | 9/2021 | Hirabe | H04B 17/309 | |
| 2021/0320707 A1* | 10/2021 | Kamiya | H04B 17/29 | |
| 2021/0399766 A1* | 12/2021 | Zenkyu | H04B 7/0697 | |
| 2022/0029301 A1* | 1/2022 | Dallal | H01Q 19/062 | |
| 2022/0029697 A1* | 1/2022 | Bakr | H04B 7/0695 | |
| 2022/0078780 A1* | 3/2022 | Choi | H04B 7/0456 | |
| 2022/0123803 A1* | 4/2022 | Rimalapudi | H04B 7/0608 | |
| 2022/0322394 A1* | 10/2022 | Yl | H04B 1/7143 | |

FOREIGN PATENT DOCUMENTS

| | | |
|---|---|---|
| JP | 2018037744 A | 3/2018 |
| JP | 2019062297 A | 4/2019 |
| WO | 2021077921 A1 | 4/2021 |
| WO | 2021104518 A1 | 6/2021 |

OTHER PUBLICATIONS

Co-pending U.S. Appl. No. 17/351,526, inventor Horn; Idan, filed Jun. 18, 2021.
Co-pending U.S. Appl. No. 17/351,819, inventor Horn; Idan, filed Jun. 18, 2021.
Co-pending U.S. Appl. No. 17/352,047, inventor Horn; Idan, filed Jun. 18, 2021.
International Search Report and Written Opinion—PCT/US2022/030378—ISA/EPO—dated Aug. 24, 2022.
International Search Report and Written Opinion—PCT/US2022/030214—ISA/EPO—dated Sep. 13, 2022.
International Search Report and Written Opinion—PCT/US2022/030352—ISA/EPO—dated Aug. 26, 2022.
Partial International Search Report—PCT/US2022/030214—ISA/EPO—dated Aug. 22, 2022.
Rui C., et al., "Spectral and Energy Efficiency of Line-of-Sight OAM-MIMO Communication Systems", China Communications, China Institute Of Communications, Piscatway, NJ, USA, vol. 17, No. 9, Sep. 1, 2020 (Sep. 1, 2020), pp. 119-127, XP011811373, ISSN: 1673-5447, DOI: 10.23919/JCC.2020.09.010 [retrieved on Sep. 25, 2020] p. 121, right-hand column line 7—p. 125, right-hand column, line 25,1,2 figures.
Tamburini F., et al., "Encoding Many Channels on the Same Frequency Through Radio Vorticity: First Experimental Fest", New Journal of Physics, IOP Institute of Physics, 2012, 18 Pages.
Vasnetsov M.V., et al., "Analysis of Orbital Angular Momentum of a Misaligned Optical Beam", New Journal of Physics, vol. 7, No. 46, 2005, pp. 1-17.
Wikipedia: "Orbital Angular Momentum of Light", Last Edited on May 20, 2021, pp. 1-9.
Yang Q., et al., "Capacity Analysis of OAM Millimeter Wave System in the Off-axis Misalignment Case", 2019 IEEE International Conference on Consumer Electronics—Taiwan (ICCE-TW), IEEE, May 20, 2019, pp. 1-2, XP033712642, the whole document.

\* cited by examiner

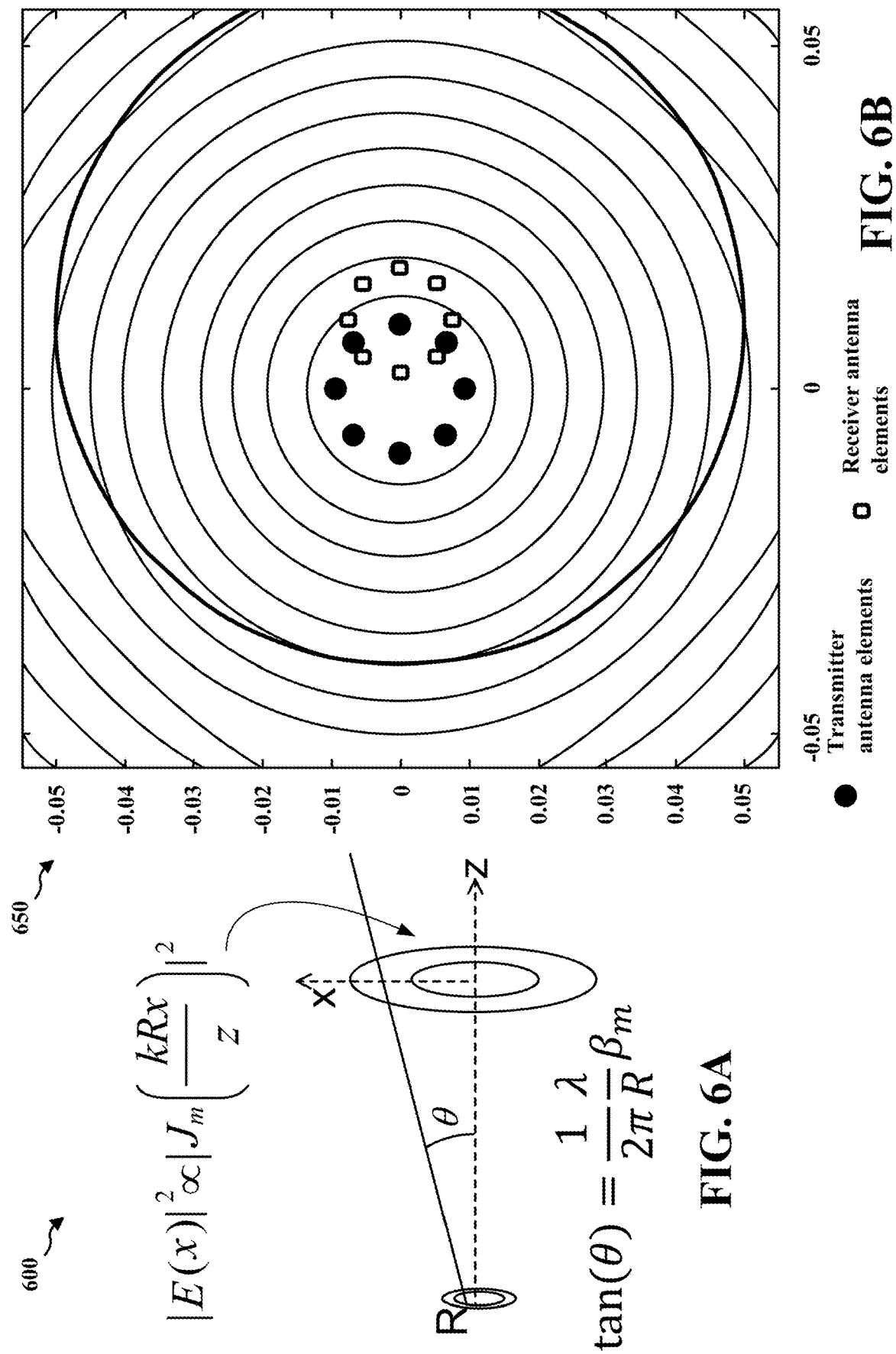

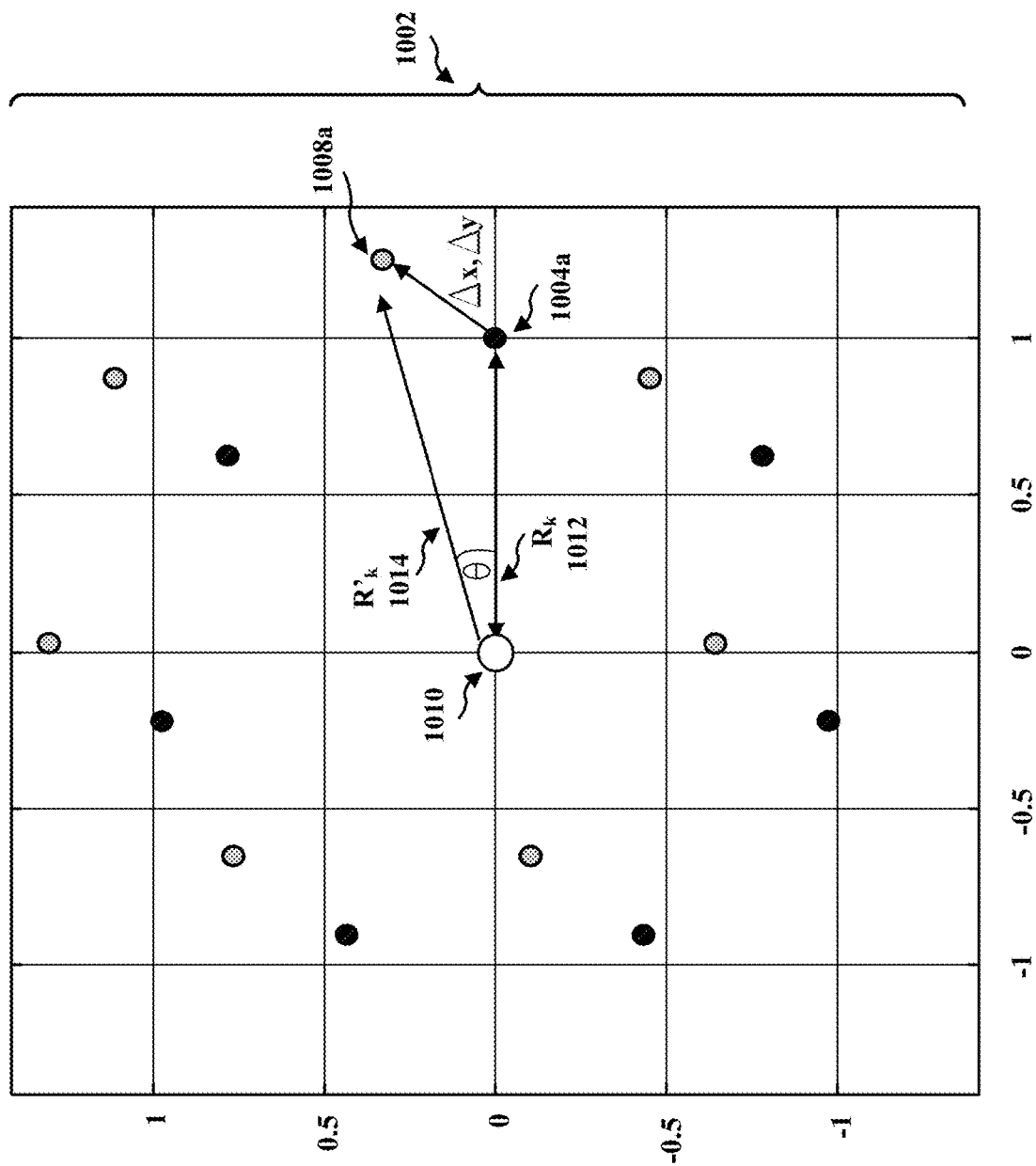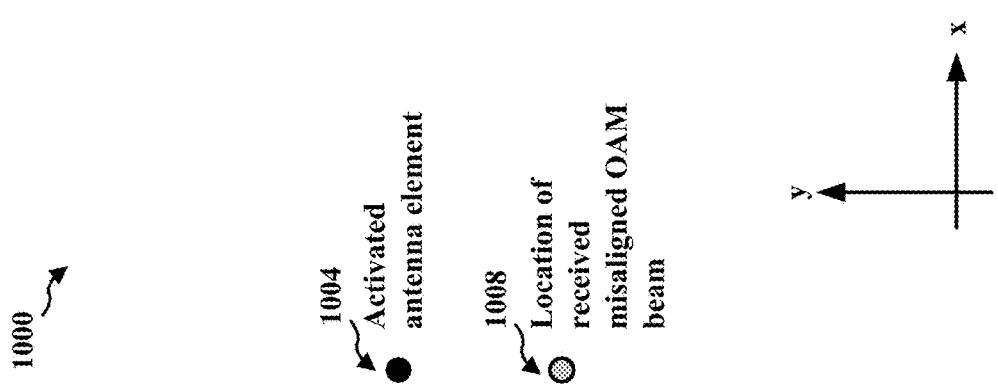
FIG. 10

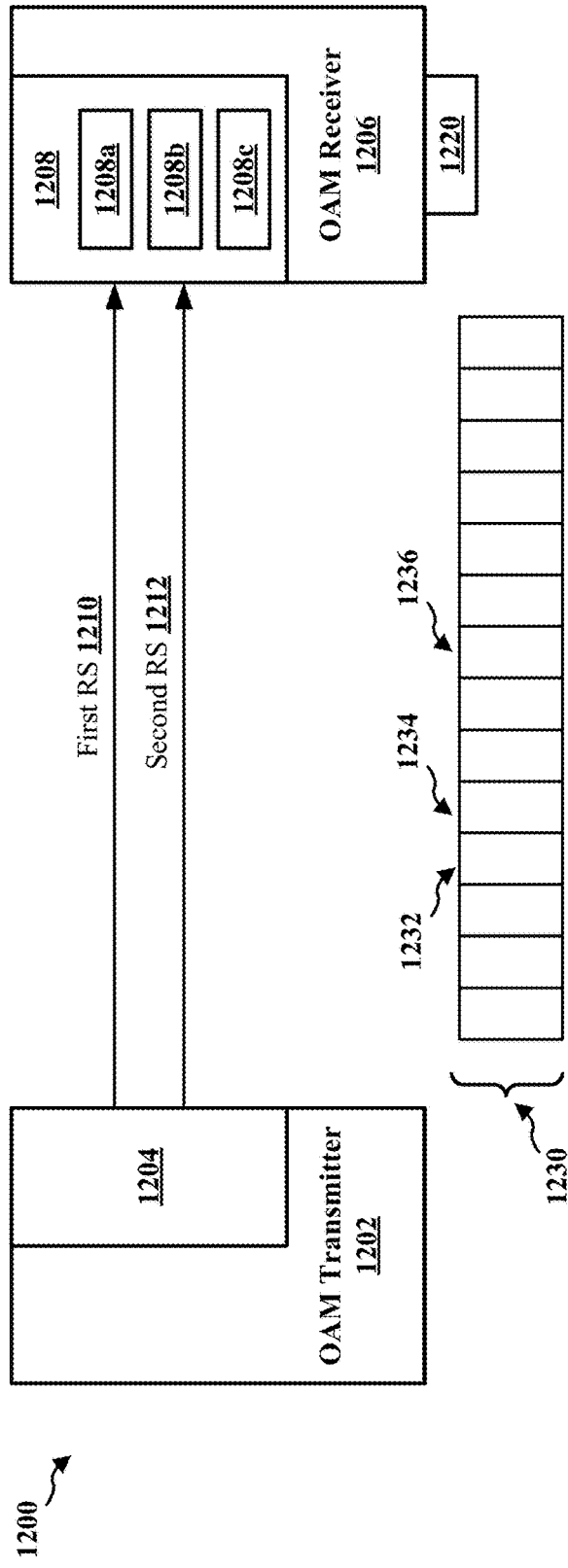
FIG. 12A
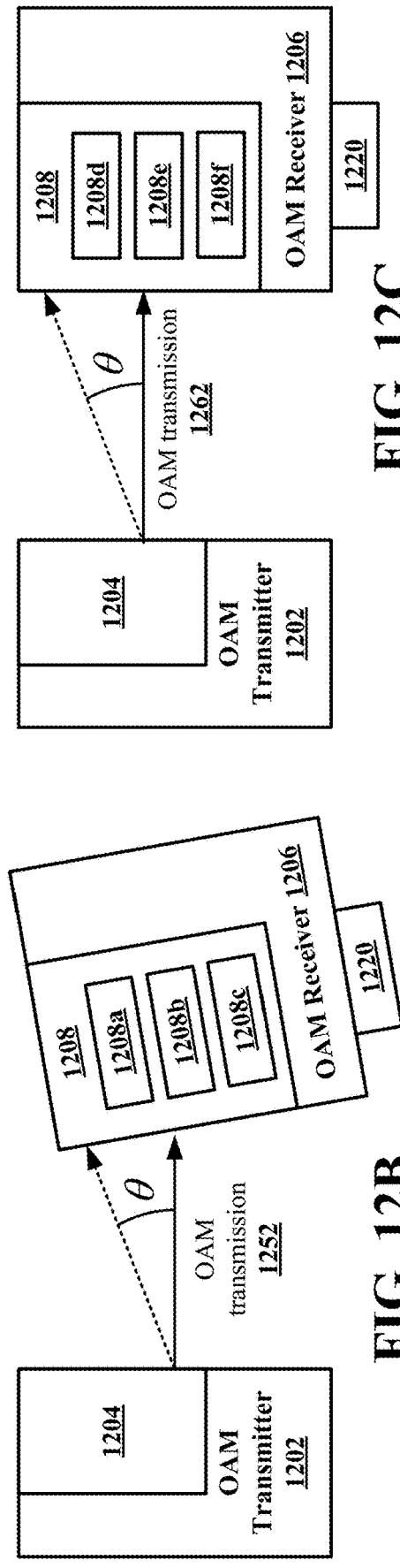
FIG. 12B
FIG. 12C

SPATIAL MISALIGNMENT TRACKING FOR ORBITAL ANGULAR MOMENTUM BEAMS IN MILLIMETER WAVE AND HIGHER FREQUENCY BANDS

INTRODUCTION

The present disclosure relates generally to communication systems, and more particularly, to wireless communication utilizing orbital angular momentum (OAM) beams.

Wireless communication systems are widely deployed to provide various telecommunication services such as telephony, video, data, messaging, and broadcasts. Typical wireless communication systems may employ multiple-access technologies with the capability to support communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method is provided for wireless communication at a first communication device. The example method includes receiving, from a second communication device, a first misalignment tracking reference signal (RS) and a second misalignment tracking RS for an orbital angular momentum (OAM) transmission. The example method also includes determining a misalignment based on the first misalignment tracking RS, the second misalignment tracking RS, and using a subset of antenna elements of an antenna array of the first communication device. Additionally, the example method includes adjusting reception of a subsequent OAM transmission from the second communication device at the antenna array of the first communication device.

In another aspect of the disclosure, an apparatus is provided for wireless communication at a first communication device. The example apparatus includes means for receiving, from a second communication device, a first misalignment tracking RS and a second misalignment tracking RS for an OAM transmission. The example apparatus also includes means for determining a misalignment based on the first misalignment tracking RS, the second misalignment tracking RS, and using a subset of antenna elements of an antenna array of the first communication device. Additionally, the example apparatus includes means for adjusting reception of a subsequent OAM transmission from the second communication device at the antenna array of the first communication device.

In another aspect of the disclosure, an apparatus comprising a memory and at least one processor coupled to the memory is provided for wireless communication at a first communication device. The at least one processor is configured to receive, from a second communication device, a first misalignment tracking RS and a second misalignment tracking RS for an OAM transmission. The example at least one processor is further configured to determine a misalignment based on the first misalignment tracking RS, the second misalignment tracking RS, and using a subset of antenna elements of an antenna array of the first communication device. Additionally, the example at least one processor is configured to adjust reception of a subsequent OAM transmission from the second communication device at the antenna array of the first communication device.

In another aspect of the disclosure, a computer-readable storage medium storing computer executable is provided for wireless communication at a first wireless device. The example code, when executed, causes a processor to receive, from a second communication device, a first misalignment tracking RS and a second misalignment tracking RS for an OAM transmission. The example code, when executed, also causes the processor to determine a misalignment based on the first misalignment tracking RS, the second misalignment tracking RS, and using a subset of antenna elements of an antenna array of the first communication device. Additionally, the example code, when executed, cause the processor to adjust reception of a subsequent OAM transmission from the second communication device at the antenna array of the first communication device.

In an aspect of the disclosure, a method is provided for wirelessly transmitting, to a first communication device, a reference signal from a second communication device. The example method includes generating a first misalignment tracking RS and a second misalignment tracking RS for an OAM transmission. The example method also includes transmitting, to the first communication device, the first misalignment tracking RS for the OAM transmission. Additionally, the example method includes transmitting, to the first communication device, the second misalignment tracking RS for the OAM transmission.

In another aspect of the disclosure, an apparatus is provided for wirelessly transmitting, to a first communication device, a reference signal from a second communication device. The example apparatus includes means for generating a first misalignment tracking RS and a second misalignment tracking RS for an OAM transmission. The example apparatus also includes means for transmitting, to the first communication device, the first misalignment tracking RS for the OAM transmission. Additionally, the example apparatus includes means for transmitting, to the first communication device, the second misalignment tracking RS for the OAM transmission.

In another aspect of the disclosure, an apparatus comprising a memory and at least one processor coupled to the memory is provided for wirelessly transmitting, to a first communication device, a reference signal from a second communication device. The at least one processor is configured to generate a first misalignment tracking RS and a second misalignment tracking RS for an OAM transmission. The example at least one processor is further configured to transmit, to the first communication device, the first misalignment tracking RS for the OAM transmission. Additionally, the example at least one processor is configured to transmit, to the first communication device, the second misalignment tracking RS for the OAM transmission.

In another aspect of the disclosure, a computer-readable storage medium storing computer executable is provided for wirelessly transmitting, to a first communication device, a reference signal from a second communication device. The example code, when executed, causes a processor to generate a first misalignment tracking RS and a second misalignment tracking RS for an OAM transmission. The example code, when executed, also causes the processor to transmit, to the first communication device, the first misalignment tracking RS for the OAM transmission. Additionally, the example code, when executed, cause the processor to transmit, to the first communication device, the second misalignment tracking RS for the OAM transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6A is a diagram depicting a radiation pattern intensity of an OAM transmission, in accordance with various aspects of the present disclosure.

FIG. 6B illustrates a diagram depicting misalignment between a transmitter and a receiver of an OAM transmission, in accordance with various aspects of the present disclosure

FIG. 10 illustrates an example antenna array including a plurality of antenna elements, in accordance with various aspects of the present disclosure.

FIG. 12A depicts an example of an OAM transmitter in communication with an OAM receiver via OAM transmission at a first time, in accordance with various aspects of the present disclosure.

FIG. 12B depicts an example of an OAM transmitter in communication with an OAM receiver via an OAM transmission at a second time, in accordance with various aspects of the present disclosure.

FIG. 12C depicts an example of an OAM transmitter in communication with an OAM receiver via an OAM transmission at a third time, in accordance with various aspects of the present disclosure.

DETAILED DESCRIPTION

Figure 1:
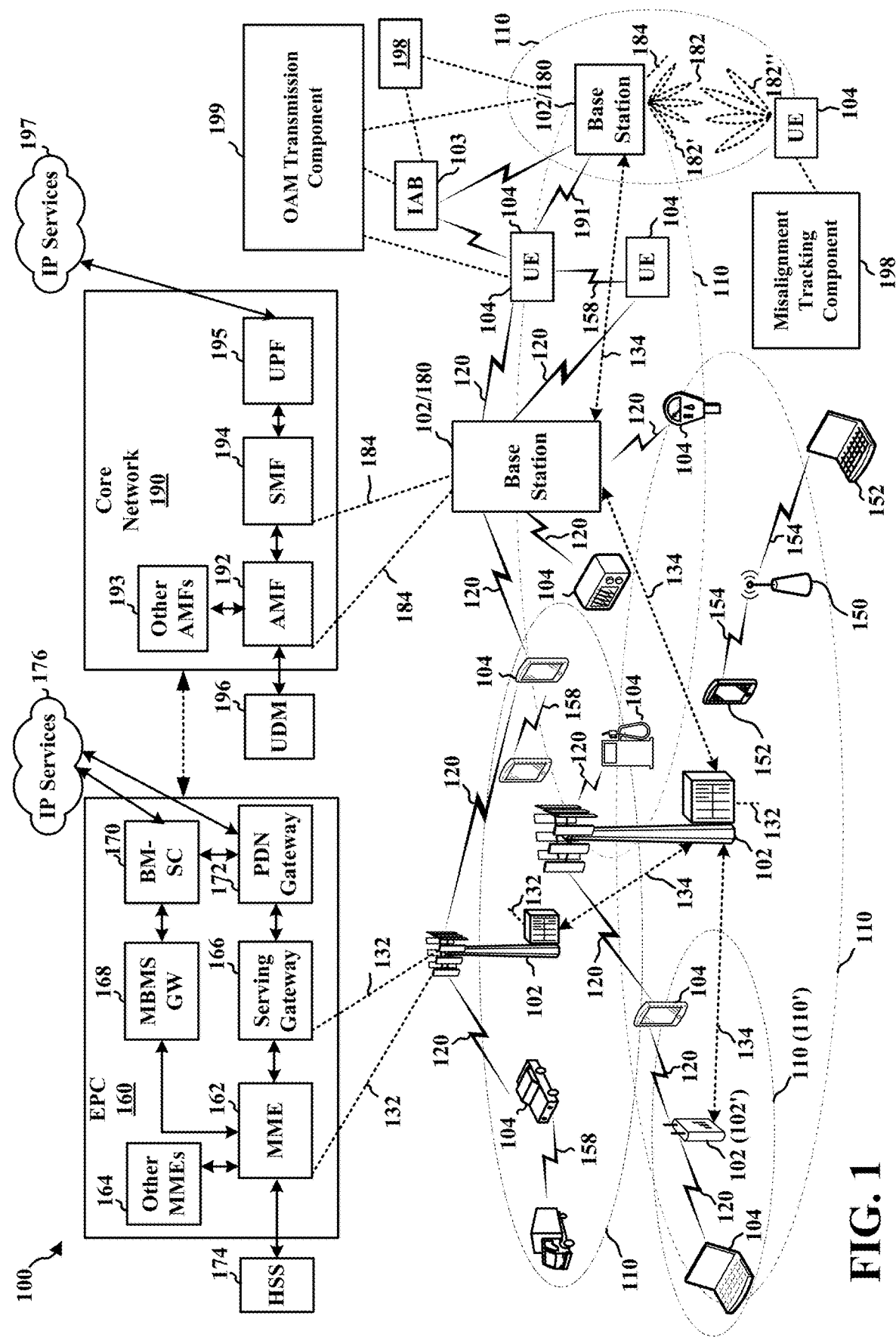
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

In wireless communications, a waveform may be applied to the electromagnetic waves corresponding to downlink, uplink, and/or sidelink transmissions. Examples of waveforms include cyclic prefix (CP) orthogonal frequency division multiplexing (OFDM) (CP-OFDM) and discrete Fourier transform (DFT) spread OFDM (DFT-s-OFDM) (also referred to as single carrier frequency-division multiple access (SC-FDMA). Applying CP-OFDM may be beneficial for high throughput scenarios, while applying DFT-s-OFDM may be beneficial for power limited scenarios or when limited to a single stream transmission.

Another example of a waveform that may be applied to a transmission is transmitting or emitting the electromagnetic waves to carry an orbital angular momentum (OAM) associated with a helical structure of a wavefront around an axis of a beam. As one example, the OAM of a light beam may correspond to a component of angular momentum of the light beam that is based on the field spatial distribution rather than polarization. In addition to light, a radio frequency signal may have an OAM helical structure. The radio frequency (RF) signal may be a signal for wireless communication and comprise a beamformed signal that may be referred to herein as a "beam." The helical structure of the beam may be characterized by a wavefront that is shaped as a helix with a vortex in the center (e.g., at the beam axis).

A helical structure of a signal may be characterized by a topological charge "m" that corresponds to a number of rotations that a helical structure exhibits in a path circling once around the center of a receiver. The topological charge m may comprise an integer and may be positive or negative depending on the direction in which the helical structure twists around the beam axis. The higher the value of the topological charge m, the faster the phase of the wavefront rotates around a beam axis. The helical structure may also be characterized by an optical phase distribution and an intensity distribution corresponding to the topological charge m.

OAM beams may be useful as a transmission scheme for line-of-sight transmissions in a wireless communication network. For example, OAM transmissions (also referred to as "OAM waveforms") may be useful for higher bands, such as the millimeter wave frequency band or higher frequency bands (e.g., FR2, FR4, etc.).

However, OAM transmissions may also be sensitive to lateral shift misalignments between a transmitter and a receiver. As used herein, the term "misalignment" refers to the difference between the intended receiving at the receiver and the actual receiving at the receiver of an OAM transmission. For example, as the distance between the transmitter and the receiver increases, the displacement size and direction relative to the beam axis of the OAM transmission may have a stronger effect on reception of a signal. The misalignment may be due to aberrations in the medium over which the OAM transmission travels. In some examples, the misalignment may be due to changes in the physical locations of the transmitter and/or the receiver. For example, in a data center, a first wireless device may transmit an OAM transmission to a second wireless device. However, while operating, one or both of the wireless devices may be moved due to, for example, the operation of the devices, due to vibrations in the floor, etc.

Thus, while OAM may improve communication when using higher bands (e.g., FR2, FR4, etc.), OAM transmissions may also be susceptible to misalignment between the transmitter and the receiver. For example, a transmitter may be positioned on the ceiling of a data center and a receiver may be positioned on top of a server rack in the data center. In some such examples, vibrations at the server rack may result in lateral shift misalignments between the transmitter and the receiver, thus degrading communication performance, for example, in the data center.

Aspects disclosed herein provide a framework to facilitate tracking and correcting spatial (e.g., horizontal and/or vertical) misalignment for wireless communication based on OAM transmissions. For example, aspects presented herein provide for generating and transmitting misalignment tracking reference signals (RSs) that enable a receiver to detect a misalignment and/or correct the misalignment. Although the term "misalignment tracking reference signal" or "misalignment tracking RS" is used herein, a RS that enables an OAM receiver to detect and/or correct misalignment with a transmitter may also be referred to by other names. The example misalignment tracking RSs may comprise a first misalignment tracking RS and a second misalignment tracking RS, which may be separated in a time-domain and/or a frequency-domain. For example, the first misalignment tracking RS may be transmitted and received at a first symbol and the second misalignment tracking RS may be transmitted and received at a second, consecutive symbol. In some examples, the misalignment tracking reference signals may be repetitions (e.g., the second misalignment tracking RS is a repetition of the first misalignment tracking RS). The first misalignment tracking RS may include a first helical phase structure, and the second misalignment tracking RS may comprise a second helical phase structure, e.g., with the second helical phase structure based on an opposite rotational direction of the first helical phase structure.

The receiver may measure a first phase for each antenna element of three or more antenna elements based on the first misalignment tracking RS and may measure a second phase for each of the three or more antenna elements based on the second misalignment tracking RS. The receiver may determine an angle relative to an optical center for each antenna element of the subset of the antenna elements based on the first phase and a conjugate of the second phase. The receiver may identify the optical center based on the determined angle for each antenna element of the subset of the antenna elements and spatial coordinates for each antenna element of the subset of the antenna elements, and the misalignment may correspond to a displacement size and direction relative to the optical center for each antenna element of the subset of the antenna elements. The receiver may then take an action to address the misalignment, such as by selecting a different set of antenna elements for reception and/or physically moving the receiver.

Aspects disclosed herein facilitate tracking and correcting misalignment of OAM transmissions. By tracking OAM transmissions, aspects disclosed herein provide techniques for a receiver to detect a misalignment of OAM transmissions. By correcting misalignment of OAM transmissions, aspects disclosed herein provide techniques for the transmitter and the receiver to improve communication performance, for example, by improving reliability.

FIG. 1 is a diagram illustrating an example of a wireless communications system and an access network 100 including base stations 102/180 and UE 104. The wireless communications system and access network 100 may include one or more UEs 104 in communication with a base station 102 or 180. The wireless communications system and access network 100 may include UEs 104 in communication with other UEs 104. The wireless communications system and access network 100 may include an integrated access and backhaul (IAB) network that includes multiple cells in communication with each other to provide an access network and a backhaul network to a core network, such as a core network 190 or Evolved Packet Core (EPC) 160. The core network 190 may be a 5G Core (5GC), e.g., a core network that supports new radio (NR) communication or another type of core network. The IAB network may include one or more IAB nodes 103. The IAB nodes may exchange communication with other IAB nodes 103, with a base station 102 or 180, and/or with UEs 104.

In some examples, the wireless communications system and access network 100 may employ an open RAN (O-RAN) to provide a standardization of radio interfaces to procure interoperability between component radio equipment. For example, in an O-RAN, the RAN may be disaggregated into a centralized unit (O-CU), a distributed unit (O-DU), and a radio unit (O-RU). The O-RU is where radio frequency (RF) signals are transmitted, received, amplified, and/or digitized. The O-RU may be located at, near, or integrated with, an antenna. The O-DU and the O-CU provide computational functions and may facilitate the transmission of digitized radio signals within the network. The O-DU may be physically located at or near the O-RU. The O-CU may be located near the core network.

The O-DU provides downlink and uplink baseband processing, a supply system synchronization clock, signal processing, and an interface with the O-CU. The O-RU provides downlink baseband signal conversion to an RF signal, and uplink RF signal conversion to a baseband signal. The O-RAN may include an open fronthaul (FH) interface between the O-DU and the O-RU.

In some examples, a wireless communication device may be configured to manage one or more aspects of wireless communication by facilitating misalignment tracking for OAM transmissions 191. FIG. 1 illustrates a non-limiting example in which the wireless device may be a UE 104 that receives an OAM signal from a base station 102 or 180. The example is merely to illustrate the concept of a receiver that is configured to detect and/or correct for misalignment with an OAM transmitter. The aspects may be applied for any wireless device that receives wireless communication based on an OAM signal. For example, aspects described in connection with UE 104 may be performed by other receivers, such a base station 102 or 180 operating as a receiver, an integrated access and backhaul (IAB) node, etc. As an example, in FIG. 1, the UE 104 may include a misalignment tracking component 198 configured to receive, from a second communication device, a first misalignment tracking RS and a second misalignment tracking RS for an OAM transmission. The example misalignment tracking component 198 may also be configured to determine a misalignment based on the first misalignment tracking RS, the second misalignment tracking RS, and using a subset of antenna elements of an antenna array of the first communication device. The example misalignment tracking component 198 may also be configured to adjust reception of a subsequent OAM transmission from the second communication device at the antenna array of the first communication device.

Still referring to FIG. 1, in some examples, a wireless communication device, such as a base station 102/180, may be configured to manage one or more aspects of wireless communication by generating and transmitting misalignment tracking RSs for OAM transmissions. As an example, in FIG. 1, the base station 102/180 may include an OAM transmission component 199 configured to generate a first misalignment tracking RS and a second misalignment tracking RS for an OAM transmission. The example OAM transmission component 199 may also be configured to transmit, to the first communication device, the first misalignment tracking RS for the OAM transmission. Additionally, the example OAM transmission component 199 may be configured to transmit, to the first communication device, the second misalignment tracking RS for the OAM transmission.

Although the following description provides examples directed to 5G NR, the concepts described herein may be applicable to other similar areas, such as LTE, LTE-A, CDMA, GSM, and/or other wireless technologies, in which a first communication device receives an OAM transmission from a second communication device. Additionally, the following aspects may be applicable to an aggregated RAN and/or to a disaggregated RAN (e.g., an O-RAN).

The example of the wireless communications system of FIG. 1 (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
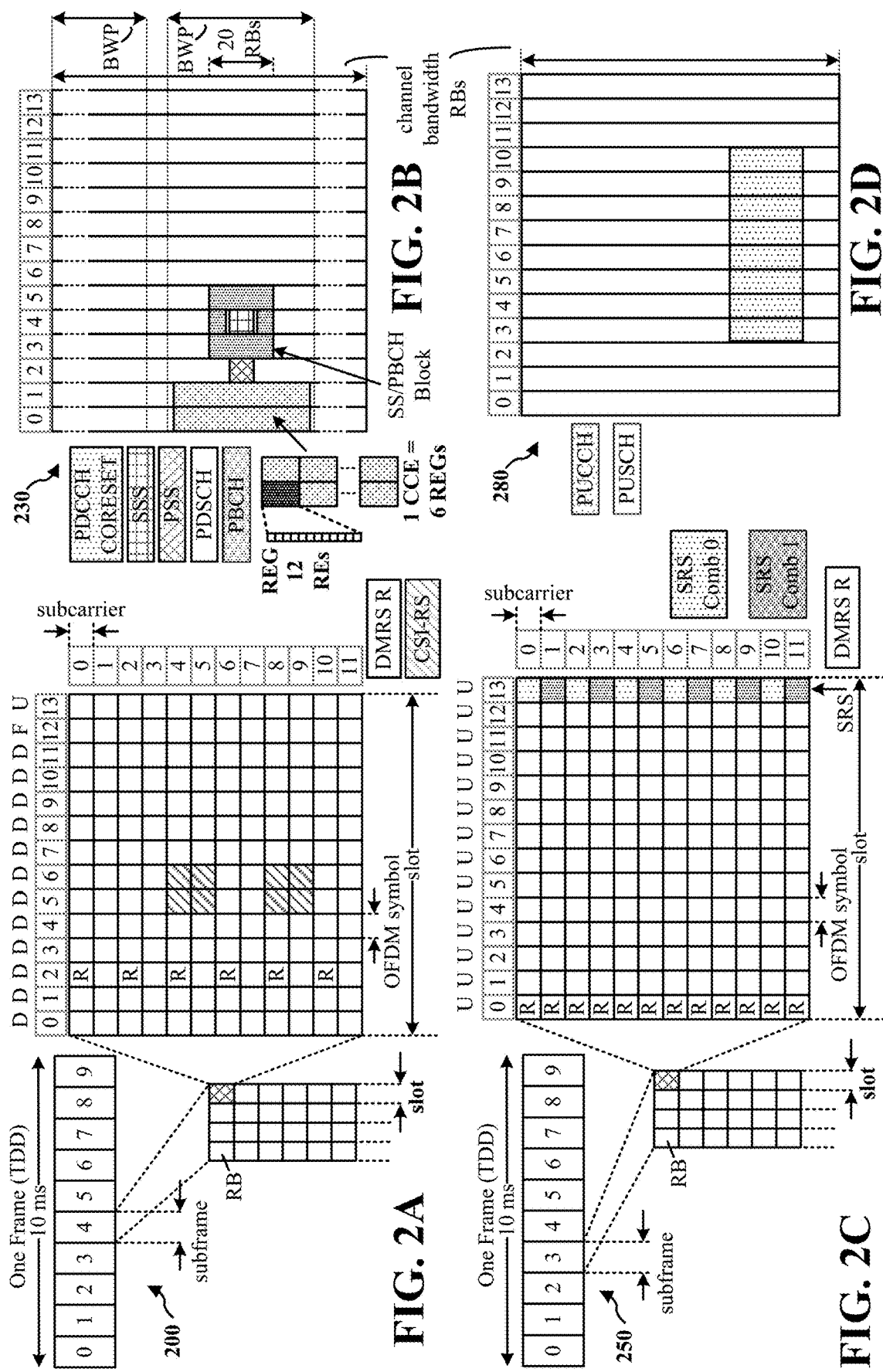
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15[kHz]$ | Cyclic prefix |
|---|---|---|
| 0 | 15 | Normal |
| 1 | 30 | Normal |

-continued

| μ | SCS $\Delta f = 2^\mu \cdot 15[kHz]$ | Cyclic prefix |
|---|---|---|
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Aspects presented herein may be applied by a receiver for the reception of wireless communication based on an OAM signal. In some examples, the receiver may be a UE receiving wireless communication from a base station or from another UE. In other examples, the receiver may be a base station, e.g., receiving the OAM signal from a UE. In other examples, the receiver may be an IAB node, e.g., receiving the OAM signal from a parent node, a child node, a UE, etc.

Figure 3:
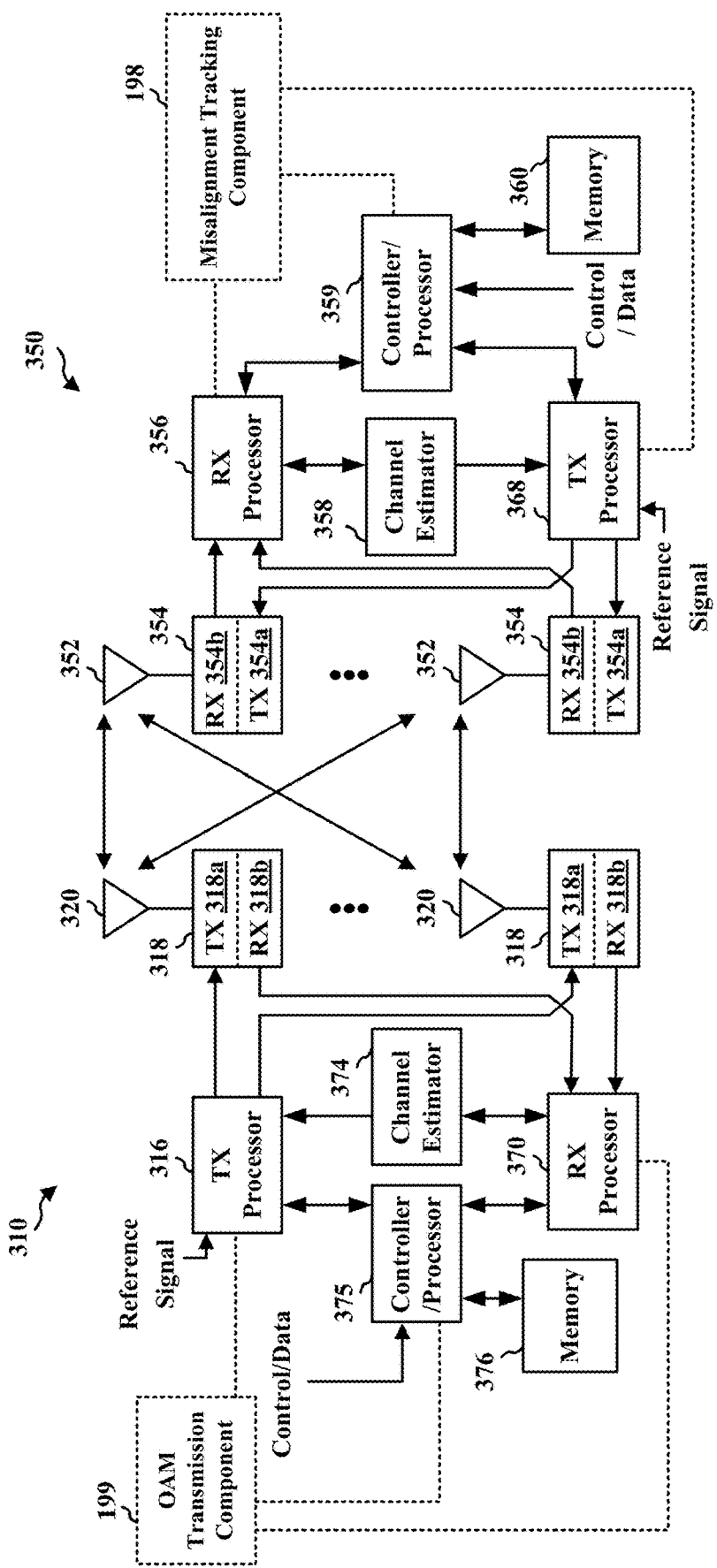
FIG. 3 is a diagram illustrating an example of a base station and user equipment (UE) in an access network.

FIG. 3 is a block diagram that illustrates an example of a first wireless device that is configured to exchange wireless communication with a second wireless device. In the illustrated example, the first wireless device may comprise a base station 310, the second wireless device may comprise a UE 350, and the base station 310 and the UE 350 may be in communication in an access network. As shown in FIG. 3, the base station 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example UE 350 includes antennas 352, a transceiver 354 including a transmitter 354a and a receiver 354b, an RX processor 356, a channel estimator 358, a controller/processor 359, memory 360, and a TX processor 368. The antennas 320, 352 may correspond to antenna elements and/or antenna arrays, described in connection with FIGS. 5A, 5B, 6A, 6B, 7, 8, 9, 10, 11, 12A, 12B, 12C, and/or 13. In other examples, the base station 310 and/or the UE 350 may include additional or alternative components.

In the DL, IP packets from the EPC 160 may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor and the RX processor implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318a. Each transmitter 318a may modulate an RF carrier with a respective spatial stream for transmission.

At the UE 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the misalignment tracking component 198 of FIG. 1.

At least one of the TX processor 316, the RX processor 370, and the controller/processor 375 may be configured to perform aspects in connection with the OAM transmission component 199 of FIG. 1.

Electromagnetic waves may be emitted or transmitted to carry an orbital angular momentum (OAM) associated with a helical structure of a wavefront around an axis of a beam. As an example, the OAM of a light beam may correspond to a component of angular momentum of the light beam that is based on the field spatial distribution rather than polarization. In addition to light, a radio frequency signal may have an OAM helical structure. The RF signal may be a signal for wireless communication and comprise a beamformed signal that may be referred to herein as a "beam." The helical structure of the beam may be characterized by a wavefront that is shaped as a helix with a vortex in the center (e.g., at the beam axis). The beams may be characterized by an integer number of times that the phase of the wavefront rotates around the beam axis. The spatial phase dependence factor of an OAM beam may be characterized by Equation 1 below.

$$\Phi(\theta)=e^{im\theta} \qquad \text{Equation 1:}$$

In Equation 1, the parameter "θ" represents the angle measure around the axis (e.g., the beam axis). The parameter "m" represents a topological charge and corresponds to a number of rotations that a helical structure (sometimes referred to as a "helical beam" or "helical wavefront") exhibits in a path circling once around the center of a receiver. The topological charge may comprise an integer and may be positive or negative depending on the direction in which the helical structure twists. The higher the value of the topological charge m, the faster the phase of the wavefront rotates around a beam axis. As an example, for OAM for light, the wavefront rotates around a beam axis. For an example with a radio frequency OAM, the beam axis may refer to an axis of the RF signal beam. The parameter "mθ" represents the phase difference acquired over the course of a cycle for the topological charge m.

Figure 4:
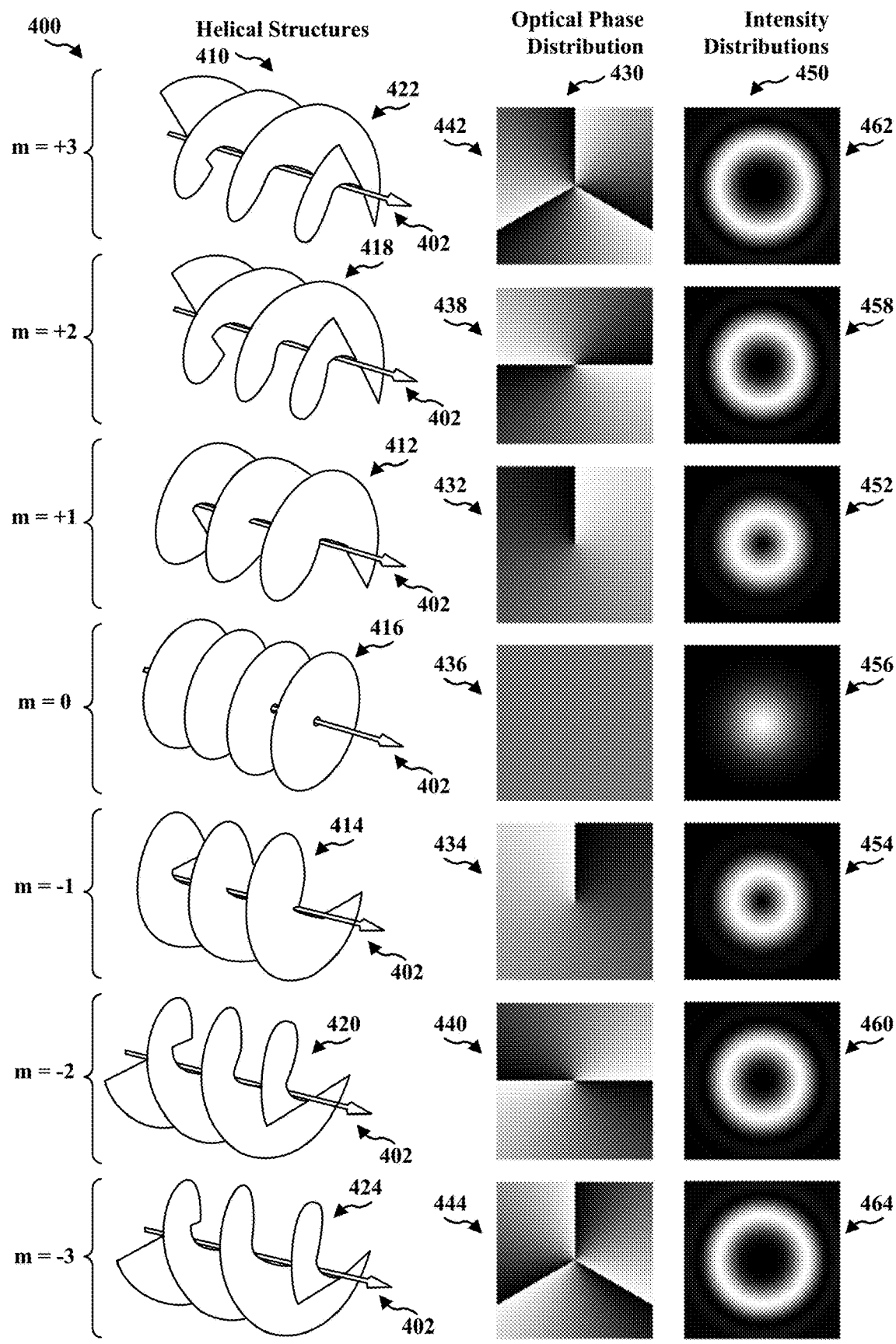
FIG. 4 is a diagram depicting example helical structures and corresponding optical phase distributions and intensity distributions, in accordance with various aspects of the present disclosure.

FIG. 4 is a diagram 400 depicting examples of different helical structures 410 and corresponding optical phase distributions 430 and intensity distributions 450. Each of the helical structures 410 depicts a shape of the helical structure and may be characterized by the topological charge m. Each of the optical phase distributions 430 depict the corresponding optical phase distributions in a beam cross-section. Each of the intensity distributions 450 depict the light intensity distribution in a beam cross-section. In some examples, the intensity distributions 450 may be referred to as a "vortex."

For example, a first helical structure 412 ("m=+1") is characterized by one rotation of phase around a beam axis 402, and in a first direction. A first optical phase distribution 432 corresponding to the first helical structure 412 indicates one cycle. That is, if a receiving element is placed perpendicular to the beam axis 402, the phase measured at the receiving element indicates that the first helical structure 412 is shaped as a single helical surface and completes one cycle (e.g. 0 to 2π) of phase rotation around the beam axis 402. A first intensity distribution 452 corresponding to the first helical structure 412 indicates a luminous intensity measured at the receiving element for the first helical structure 412. Because of the twisting nature of the first helical structure 412, the lights wave at the beam axis 402 cancel each other. When projected onto a flat surface (e.g., the receiving element placed perpendicular to the beam axis 402), the intensity distribution (or "optical vortex") appears as a ring of light with a dark vortex core in the center. The dark cortex core (also referred to as a "singularity") corresponds to a region of low intensity.

The example of FIG. 4 includes a second helical structure 414 ("m=−1") that is also characterized by one rotation of phase around the beam axis 402. As shown in FIG. 4, the second helical structure 414 is based on an opposite rotational direction of the first helical structure 412. For example, the first optical phase distribution 432 indicates a clockwise rotation of the first helical structure 412 and a second optical phase distribution 434 corresponding to the second helical structure 414 indicates a counter-clockwise rotation of the second helical structure 414. A second intensity distribution 454 corresponding to the second helical structure 414 indicates a similar intensity distribution as the first intensity distribution 452.

The example of FIG. 4 also includes a third helical structure 416 ("m=0") that is characterized by zero rotations around the beam axis 402. That is, the third helical structure 416 indicates that the corresponding beam is not helical-shaped. As a result, the wavefronts associated with the third helical structure 416 are depicted as multiple disconnected surfaces, such as a sequence of parallel planes. As there is no "twist" or phase rotation associated with the third helical structure 416, a third optical phase distribution 436 corresponding to the third helical structure 416 indicates a same phase. Additionally, as there is not twist in the phase rotation associated with the third helical structure 416, a corresponding third intensity distribution 456 does not depict a singularity at the center since the light waves associated with the third helical structure 416 do not cancel each other out.

The example of FIG. 4 also includes a fourth helical structure 418 ("m=+2") and a fifth helical structure 420 ("m=−2"). The fourth helical structure 418 and the fifth helical structure 420 are characterized by two rotations around the beam axis 402. As shown in FIG. 4, the fifth helical structure 420 is based on an opposite rotational direction of the fourth helical structure 418. A fourth optical phase distribution 438 corresponding to the fourth helical structure 418 indicates that the fourth helical structure 418 is shaped as a double helical surface and completes two cycles (e.g., two completions of 0 to $2\pi$ or $4\pi$) of phase rotation around the beam axis 402. Additionally, the singularity at a fourth intensity distribution 458 corresponding to the fourth helical structure 418 is larger than, for example, the first intensity distribution 452 as the additional "twists" associated with the fourth helical structure 418 provide additional light beams to cancel each other out, resulting in an increased low intensity region.

A fifth optical phase distribution 440 corresponding to the fifth helical structure 420 indicates that the fifth helical structure 420 is based on an opposite rotational direction of the fourth helical structure 418. For example, the fourth optical phase distribution 438 indicates two clockwise rotations of the fourth helical structure 418 and the fifth optical phase distribution 440 indicates two counter-clockwise rotations of phase of the fifth helical structure 420. A fifth intensity distribution 460 corresponding to the fifth helical structure 420 indicates a similar intensity distribution as the fourth intensity distribution 458.

The example of FIG. 4 also includes a sixth helical structure 422 ("m=+3") and a seventh helical structure 424 ("m=−3"). The sixth helical structure 422 and the seventh helical structure 424 are characterized by three rotations around the beam axis 402. As shown in FIG. 4, the seventh helical structure 424 is based on an opposite rotational direction of the sixth helical structure 422. A sixth optical phase distribution 442 corresponding to the sixth helical structure 422 indicates that the sixth helical structure 422 is shaped as a triple helical surface and completes three cycles (e.g., three completions of 0 to $2\pi$ or $6\pi$) of phase rotation around the beam axis 402. Additionally, the singularity at a sixth intensity distribution 462 corresponding to the sixth helical structure 422 is larger than, for example, the first intensity distribution 452 as the additional "twists" associated with the sixth helical structure 422 provide additional light beams to cancel each other out, resulting in an increased low intensity region.

A seventh optical phase distribution 444 corresponding to the seventh helical structure 424 indicates that the seventh helical structure 424 is based on an opposite rotational direction of the sixth helical structure 422. For example, the sixth optical phase distribution 442 indicates three clockwise rotations of the sixth helical structure 422 and the seventh optical phase distribution 444 indicates three counter-clockwise rotations of phase of the seventh helical structure 424. A seventh intensity distribution 464 corresponding to the seventh helical structure 424 indicates a similar intensity distribution as the sixth intensity distribution 462.

OAM beams may be useful as a transmission scheme for line-of-sight transmissions in a wireless communication network, such as the access network 100 of FIG. 1. For example, OAM transmissions (also referred to as "OAM waveforms") may be useful for higher bands, such as the millimeter wave frequency band or higher frequency bands (e.g., FR2, FR4, etc.). When employing MIMO technology, each topological charge of an OAM transmission may correspond to an orthogonal carrier.

Figure 5A:
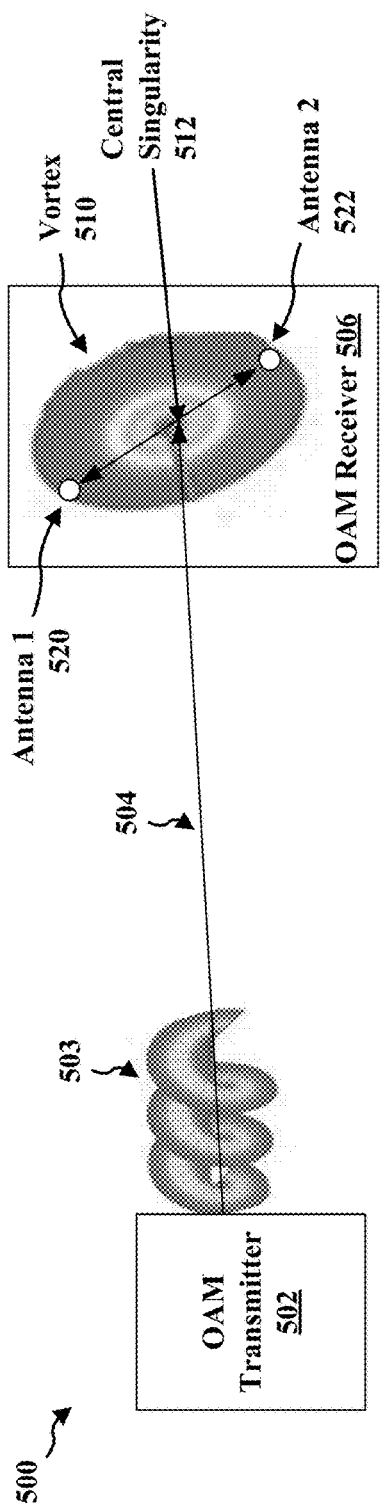
FIG. 5A depicts an example of an OAM transmission including a transmitter, in accordance with various aspects of the present disclosure.

A helical structure for use in wireless communication may be generated using various techniques. As an example, FIG. 5A depicts an example 500 of an OAM transmission 503 transmitted by an OAM transmitter 502 and received by an OAM receiver 506. In some examples, the OAM transmitter 502 may include a component that is configured to generate a helical structure with a particular topological charge. In some examples, an optical element, such as a lens, may be employed to generate the desired helical structure. For example, a lens may be positioned and configured so that a beam output by the OAM transmitter 502 is shaped with a particular topological charge (e.g., m=+1, m=−1, etc.). In other examples, a lens may not be used.

An antenna array at a receiver (e.g., the OAM receiver 506) may receive the OAM transmission 503 output by the OAM transmitter 502. The OAM transmission 503 may comprise a beam axis 504, e.g., an axis of a beamformed signal. FIG. 5A depicts a vortex 510 that may correspond to the intensity distribution of the OAM transmission 503. The vortex 510 includes a singularity 512 (e.g., a central singularity) associated with a low intensity region.

The antenna array at the receiver may include a set of connected antenna elements. The antenna elements operate as the interface between radio waves and a transmitter and/or a receiver. The antenna elements of the antenna array may operate as a single antenna to transmit and/or receive transmissions. Thus, an antenna may correspond to an antenna element and/or an antenna array, while an antenna array may correspond to a set of connected antenna elements, as described in connection with FIGS. 6B, 7, 8, 9, and/or 10. The OAM transmission 503 may be received at multiple antenna elements at the OAM receiver 506, such as a first antenna element 520 ("Antenna 1") and a second antenna element 522 ("Antenna 2"). In some examples, the first antenna element 520 and the second antenna element 522 may be part of a same antenna array. In some examples, the first antenna element 520 may be part of a first antenna array and the second antenna element 522 may be part of a second antenna array different than the first antenna array. For example, the first antenna array may be associated with a first transmit-receive point (TRP) and the second antenna array may be associated with a second TRP.

The OAM receiver 506 may compare the detected phases around the singularity 512 to determine the topological charge associated with the OAM transmission 503. For example, the OAM receiver 506 may measure the phase at the first antenna element 520 and the phase at the second antenna element 522 relative to the singularity 512 to determine the topological charge associated with the OAM transmission 503. In some examples, the number of antenna elements at which measurements are made may be based on the topological charge. For example, the receiver may use a number of antenna elements based on Equation 2 below.

$$\text{Number of elements} \geq 2|m|+1 \qquad \text{Equation 2:}$$

In Equation 2, the number of elements is determined as at least one more than twice the absolute value of the topological charge. For example, to detect a topological charge of m=+1 or m=−1, the receiver may employ at least three antenna elements to measure the phase. However, in some examples, the number of elements may depend on the configuration of the elements at the OAM receiver 506.

In some examples, reception of OAM transmissions may be sensitive to lateral shift misalignments between a transmitter and a receiver. For example, as the distance between the transmitter and the receiver increases, the displacement size and direction relative to the beam axis of the OAM transmission may have an increased effect on accurate reception of the OAM transmission. The misalignment may be due to aberrations in the medium over which the OAM transmission travels. In some examples, the misalignment may be due to changes in the physical locations of the transmitter and/or the receiver. For example, in a data center, a first wireless device (e.g., a server rack) may transmit an OAM transmission to a second wireless device. However, while operating, one or both of the wireless devices may be moved due to, for example, the operation of the wireless devices, due to vibrations in the floor, etc.

Figure 5B:
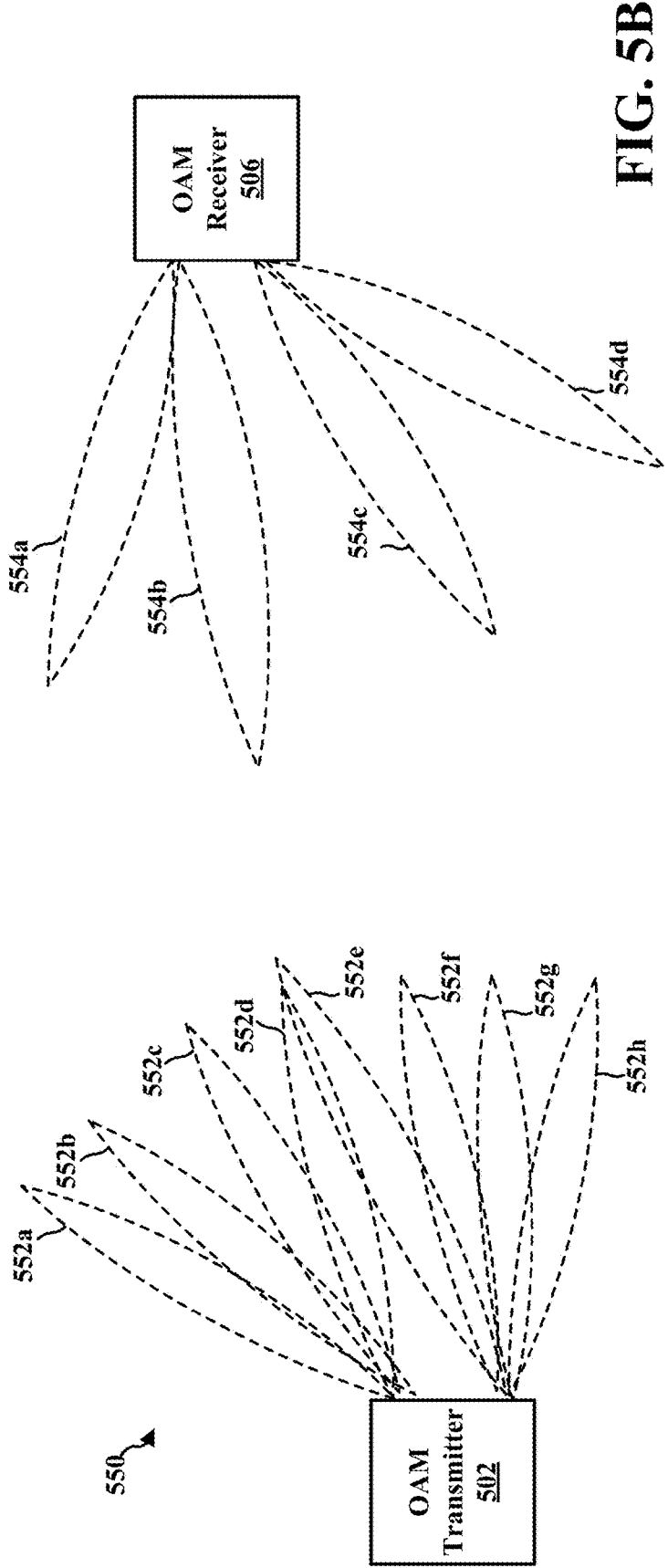
FIG. 5B depicts an example of an OAM transmitter in communication with an OAM receiver via an OAM transmission, in accordance with various aspects of the present disclosure.

FIG. 5B is a diagram 550 illustrating the OAM transmitter 502 in communication with the OAM receiver 506. Referring to FIG. 5B the OAM transmitter 502 may transmit a beamformed signal to the OAM receiver 506 in one or more directions 552a, 552b, 552c, 552d, 552e, 552f, 552g, 552h. The OAM receiver 506 may receive the beamformed signal from the OAM transmitter 502 in one or more receive directions 554a, 554b, 554c, 554d. The OAM receiver 506 may also transmit a beamformed signal to the OAM transmitter 502 in one or more of the directions 554a, 554b, 554c, 554d. The OAM transmitter 502 may receive the beamformed signal from the OAM receiver 506 in one or more of the receive directions 552a, 552b, 552c, 552d, 552e, 552f, 552g, 552h. The OAM transmitter 502/OAM receiver 506 may perform beam training to determine the best receive and transmit directions for each of the OAM transmitter 502/OAM receiver 506. The transmit and receive directions for the OAM transmitter 502 may or may not be the same. The transmit and receive directions for the OAM receiver 506 may or may not be the same.

A beam-pair link (BPL) refers to a transmit beam and receive beam pair. For example, a first BPL may include a transmit direction 552c and receive direction 554b pair, and a second BPL may include a transmit direction 554c and receive direction 552g pair.

In the example of FIGS. 5A and 5B, the OAM transmitter 502 may be implemented by a base station, such as the base station 102/180, the base station 310, the UE 350, and/or an IAB device (e.g., a distributed unit (DU) node of the IAB device and/or a mobile termination (MT) node of the IAB device). Aspects of the OAM receiver 506 may be implemented by a UE, such as the UE 104, the base station 310, the UE 350, and/or an IAB device (e.g., a distributed unit (DU) node of the IAB device and/or a mobile termination (MT) node of the IAB device).

FIG. 6A is a diagram 600 depicting a radiation pattern intensity of an OAM transmission, as presented herein. An OAM transmission may comprise a radiating ring with a helical phase for a particular OAM order m, as described in connection with FIG. 4. The OAM transmission and the radiating ring may generate a conical beam, as shown in the diagram 600 of FIG. 6A. The divergence angle may depend on m (e.g., beam order), radiating ring diameter, and wavelength. The radiation pattern intensity may follow a Bessel function of the first kind. The energy of $J_m(x)$ for different m values do not substantially overlap.

FIG. 6B illustrates a diagram 650 depicting misalignment between a transmitter and a receiver of an OAM transmission. In the illustrated example, a transmitter transmits an OAM transmission using eight transmitter antenna elements (shown as eight solid circles in the center of the diagram 650). A receiver receives the OAM transmission at locations corresponding to eight receiver antenna elements (shown as eight circles near the center of the diagram 650) of an antenna array.

Aspects disclosed herein provide a framework to facilitate tracking and correcting spatial (e.g., horizontal and/or vertical) misalignment for wireless communication based on OAM transmissions. For example, aspects presented herein provide for the generation and transmission of misalignment tracking reference signals (RSs) that allow a receiver to detect a misalignment and/or correct the misalignment in order to more accurately receive an OAM transmission. The detection and correction of the misalignment may enable a transmitter and receiver to improve alignment, and thereby to improve reception of an OAM transmission. The example misalignment tracking RSs may comprise a first misalignment tracking RS and a second misalignment tracking RS, which may be separated in a time-domain and/or a frequency-domain. For example, the first misalignment tracking RS may be transmitted and received at a first symbol and the second misalignment tracking RS may be transmitted and received at a second, consecutive symbol. In some examples, the misalignment tracking reference signals may be repetitions. The first misalignment tracking RS may include a first helical phase structure (e.g., with a topological charge of m=1), and the second misalignment tracking RS may comprise a second helical phase structure, e.g., with the second helical phase structure based on an opposite rotational direction (e.g., with a topological charge of m=−1) of the first helical phase structure.

The misalignment tracking RS may be a new reference signal that allow for detecting misalignment with respect to OAM transmissions. For example, the RS may be different than existing reference signals, such as CSI-RS, DM-RS, BRS, PT-RS, and/or SSB, which enable a receiving device to determine information regarding channel quality, timing, and/or power estimation associated with a transmission. However, reference signals such as CSI-RS, DM-RS, BRS, PT-RS, SSB, etc., may not provide information to allow the receiving device to determine a receiver misalignment due to the nature of OAM transmissions. For example, the misalignment tracking RSs disclosed herein facilitate determining a horizontal and/or vertical misalignment associated with an OAM transmission. The disclosed misalignment tracking RS may also facilitate estimation of a rotational mismatch between the antenna array at the transmitter and the antenna array at the receiver.

Figure 7:
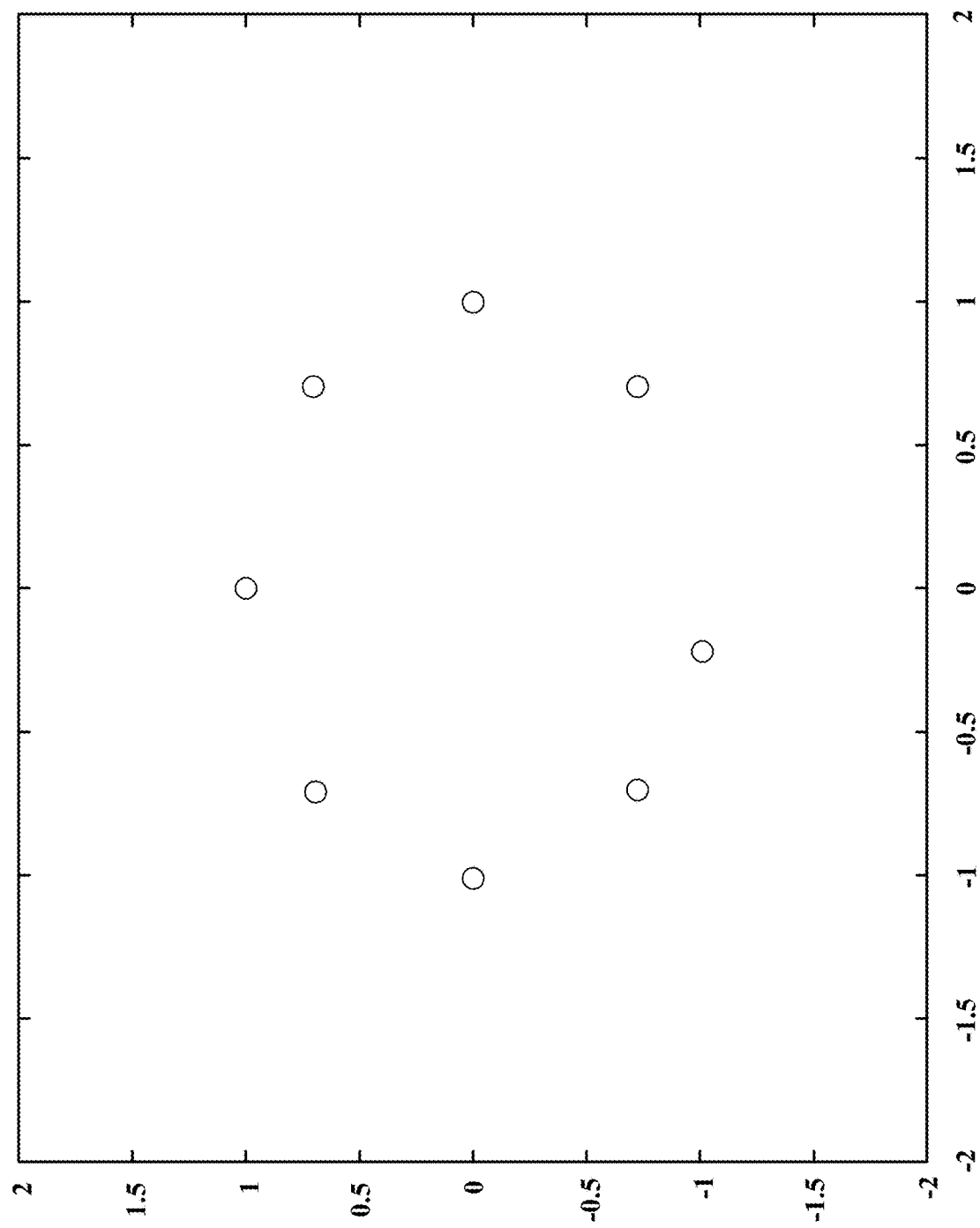
FIG. 7 illustrates an example implementation of an antenna array that may be used to transmit and receive an OAM transmission, in accordance with various aspects of the present disclosure.
Figure 8:
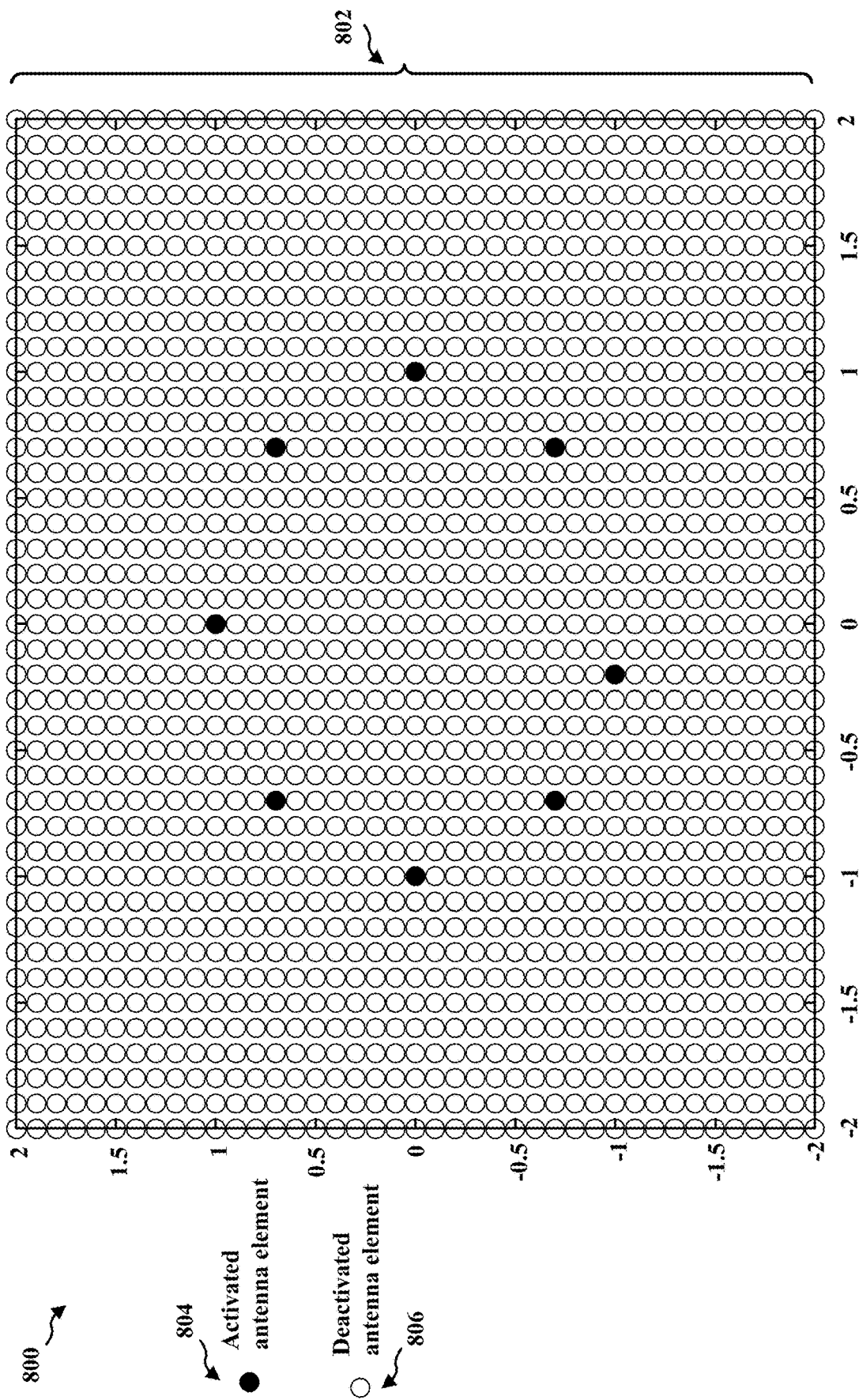
FIG. 8 illustrates an example implementation of another antenna array that may be used to transmit and receive an OAM transmission, in accordance with various aspects of the present disclosure.

FIG. 7 and FIG. 8 illustrate example implementations of an antenna array that may be used to transmit and receive an OAM transmission. In the illustrated examples of FIGS. 7 and 8, the respective antenna arrays include a plurality of antenna elements. The antenna elements of the respective antenna arrays may be connected and operate as a single antenna to receive and/or transmit transmissions. In the illustrated example of FIG. 7, an antenna array 700 comprises eight antenna elements arranged in a circle. In the illustrated example of FIG. 8, an antenna array 800 comprises a plurality of antenna elements 802 from which a subset of antenna elements may be activated for transmitting and receiving an OAM transmission. In the illustrated example of FIG. 8, the antenna array 800 comprises eight activated antenna elements 804 (shown as solid black circles in the example of FIG. 8) and the remaining antenna elements of the plurality of antenna elements 802 are deactivated antenna elements 806. It may be appreciated that activating a subset of the antenna elements of the antenna array 800, rather than all of the antenna elements of the antenna array 800, may be beneficial in power savings.

Although the examples of FIGS. 7 and 8 illustrate a circular pattern of activated antenna elements, other examples may employ additional or alternate patterns for receiving and transmitting OAM transmissions. Additionally, additional or alternate examples may include different quantities of activated antenna elements.

Figure 9:
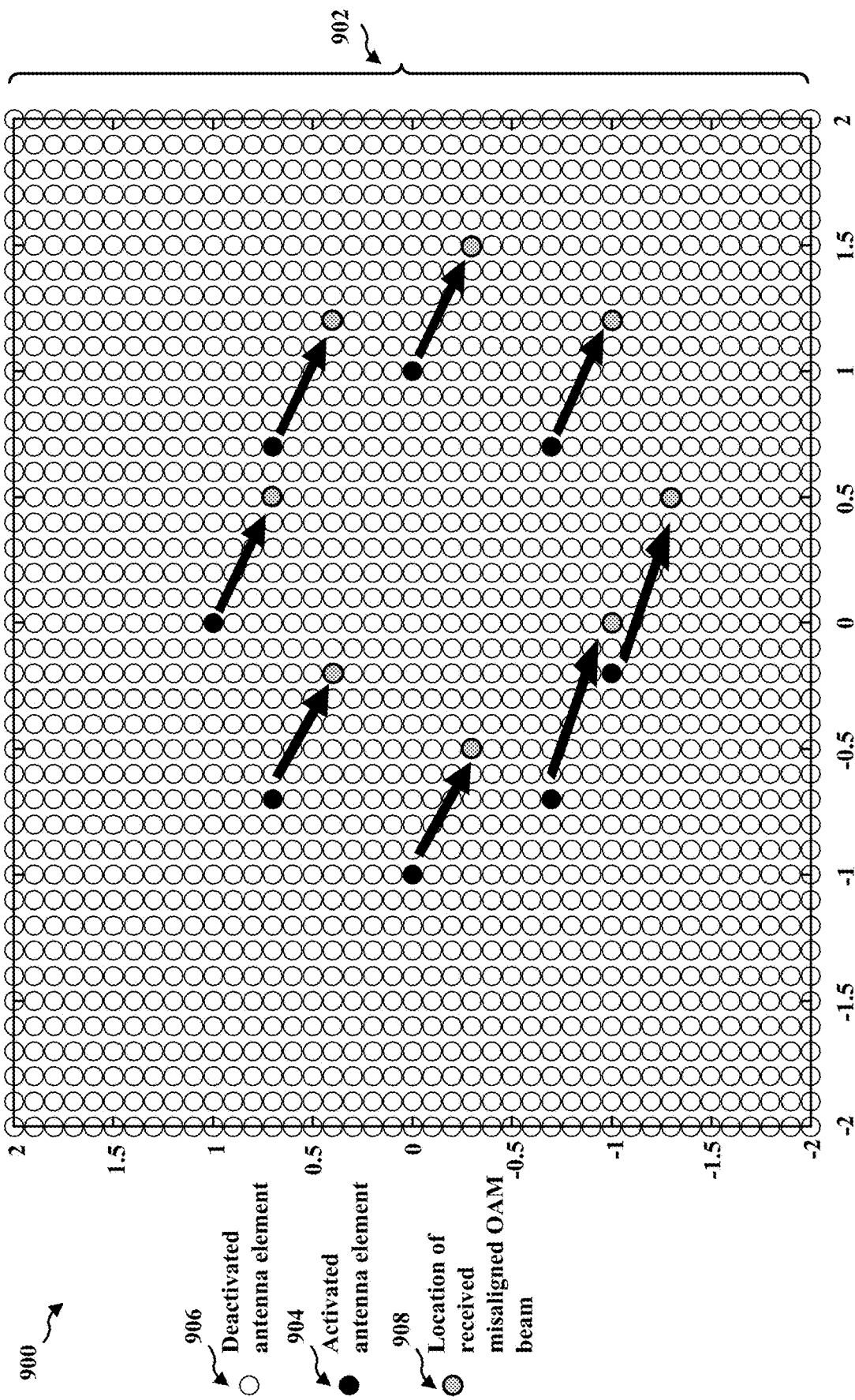
FIG. 9 illustrates an example of an antenna array including a plurality of antenna elements, in accordance with various aspects of the present disclosure.

FIG. 9 illustrates an example of an antenna array 900 including a plurality of antenna elements 902. In the illustrated example, the antenna array 900 includes a subset of activated antenna elements 904 and a subset of deactivated antenna elements 906. Similar to the examples of FIGS. 7 and 8, the antenna elements 902 of the antenna array 900 may be connected and operate as a single antenna to receive and/or transmit transmissions. As shown in FIG. 9, the antenna array 900 includes eight example activated antenna elements 904 arranged in a circular pattern.

As described above, OAM transmissions may be sensitive to spatial misalignment between the transmitter and the receiver. For example, in FIG. 9, a spatial misalignment between the transmitter and the receiver may cause an OAM transmission to be received at antenna elements 908 corresponding to received misaligned OAM beams.

Aspects disclosed herein facilitate a transmitting device to periodically transmit misalignment tracking reference signals that are received by the receiving device. The receiving device may use the misalignment tracking reference signals to scan over the receiver antenna elements to find any misalignment between the transmitter and the receiver. In some examples, the misalignment tracking reference signals may have one or more repetitions to increase the chances of the receiving device scanning the receiver antenna elements. The misalignment tracking reference signals enable the receiving device to estimate horizontal and/or vertical misalignments. The misalignment tracking reference signals disclosed herein may additional enable the receiving device to estimate any rotational mismatch between the receiver and the transmitter.

Referring again to the example of FIG. 9, the receiving device may determine the locations of the antenna elements 908 corresponding to the received misaligned OAM beams. The receiving device may use the determined locations to measure the horizontal and/or vertical misalignment between the transmitter and the receiver. The receiving device may also determine any rotational mismatch between the receiver and the transmitter. Based on the determined misalignment, the receiving device may adjust reception of a subsequent OAM transmission. For example, the receiving device may determine to activate the antenna elements 908 corresponding to the received misaligned OAM beams. In some examples, the receiving device may mechanically move the antenna array 900 so that the activated antenna elements 904 align with the transmitter to correct the misalignment. In some examples, the receiver may mechanically move the antenna array 900 and activate a second subset of antenna elements to correct the misalignment between the transmitter and the receiver.

FIG. 10 illustrates an example antenna array 1000 including a plurality of antenna elements 1002. The example of FIG. 10 includes seven activated antenna elements 1004 and antenna elements 1008 at locations corresponding to received misaligned OAM beams due to spatial misalignment between the transmitter and the receiver. For simplicity, the example of FIG. 10 does not include the deactivated antenna elements of the antenna array 1000 that are not located at locations corresponding to spatial misalignment. Similar to the examples of FIGS. 7, 8, and 9, the antenna elements 1004, 1008 of the antenna array 1000 may be connected and operate as a single antenna to receive and/or transmit transmissions.

In the example of FIG. 10, a first activated antenna element 1004a (antenna element 'k') is located a first distance 1012 ("R_k") from an optical center 1010. A first misalignment antenna element 1008a is located a second distance 1014 ("R_k") from the optical center 1010. The difference between the first distance 1012 and the second distance 1014 may be characterized as a displacement in the x-direction ("Δx") and a displacement in the y-direction ("Δy").

Aspects disclosed herein enable a receiving device to determine the displacements Δx and Δy based on received misalignment tracking reference signals. For example, the receiving device may receive a first misalignment tracking reference signal comprising a first helical phase structure and receive a second misalignment tracking reference signal comprising a second helical phase structure. The receiving device may measure phases for at least three non-co-linear elements (e.g., elements not in a straight line) for the first and second misalignment tracking reference signals. However, it may be appreciated that the quantity of elements for which the phase is measured for the first and second misalignment tracking reference signals may be determined based on the topological charge m of the first and second misalignment tracking reference signals, as described in connection with Equation 2 (above). Based on the measured phases, the receiving device may determine the location of the optical center. The receiving device may then use the known spatial coordinates for the antenna elements and the optical center to determine the misalignment. Aspects disclosed herein may then adjust reception of a subsequent OAM transmission based on the misalignment.

FIG. 12A depicts an example 1200 of an OAM transmitter 1202 in communication with an OAM receiver 1206 via OAM transmission at a first time, as presented herein. FIG. 12B depicts an example 1250 of the OAM transmitter 1202 in communication with the OAM receiver 1206 via OAM transmission at a second time, as presented herein. FIG. 12C depicts an example 1260 of the OAM transmitter 1202 in communication with the OAM receiver 1206 via OAM transmission at a third time, as presented herein. Aspects disclosed herein facilitate tracking and correcting misalignment of OAM transmissions. By tracking OAM transmissions, aspects disclosed herein provide techniques for a receiver to detect a misalignment of OAM transmissions. By correcting misalignment of OAM transmissions, aspects disclosed herein provide techniques for the transmitter and the receiver to improve communication performance, for example, by improving reliability.

Aspects of the OAM transmitter 1202 and/or the OAM receiver 1206 may be implemented by the UE 104 of FIG. 1, the UE 350 of FIG. 3, the base station 102/180 of FIG. 1, and/or the base station 310 of FIG. 3. In some examples, at least one of the OAM transmitter 1202 or the OAM receiver 1206 may comprise an IAB node. For example, the OAM transmitter 1202 may be an IAB node and the OAM receiver 1206 may be a parent node, a child node, a UE, a base station, etc.

In the illustrated examples of FIGS. 12A, 12B, and 12C, the OAM transmitter 1202 includes an antenna array 1204. The antenna array 1204 may include one or more antenna elements. In some examples, the antenna array 1204 may include one or more sets of antenna elements. For example, the antenna array 1204 may include a first set of antenna elements and a second set of antenna elements. In such examples, the first set of antenna elements may comprise a first TRP and the second set of antenna elements may comprise a second TRP.

Similar to the OAM transmitter 1202, the OAM receiver 1206 of FIGS. 12A, 12B, and 12C includes an antenna array 1208. The antenna array 1208 may include one or more antenna elements. As shown in FIGS. 12A and 12B, the antenna array 1208 includes a first antenna element 1208*a*, a second antenna element 1208*b*, and a third antenna element 1208*c*. In the examples of FIGS. 12A and 12B, the antenna elements 1208*a*, 1208*b*, 1208*c* of the antenna array 1208 are non-co-linear elements (e.g., antenna elements that are not located in a line). As shown in FIG. 12C, the antenna array 1208 includes a fourth antenna element 1208*d*, a fifth antenna element 1208*e*, and a sixth antenna element 1208*f*. In the example of FIG. 12C, the antenna elements 1208*d*, 1208*e*, 1208*f* of the antenna array 1208 are non-co-linear elements. Similar to the OAM transmitter 1202, the antenna array 1208 may include one or more sets of antenna elements. For example, the antenna array 1208 may include a first set of antenna elements (e.g., the first antenna element 1208*a*, the second antenna element 1208*b*, and the third antenna element 1208*c*) and a second set of antenna elements (e.g., the fourth antenna element 1208*d*, the fifth antenna element 1208*e*, and the sixth antenna element 1208*f*). In examples, the first set of antenna elements may comprise a first TRP and the second set of antenna elements may comprise a second TRP. In other examples, the first set of antenna elements and the second set of antenna elements may be different respective subsets of antenna elements of a same antenna array or a same TRP.

Aspects disclosed herein provide a framework to facilitate tracking and correcting spatial (e.g., horizontal and/or vertical) misalignment for wireless communication based on OAM transmissions. For example, aspects presented herein provide for the OAM transmitter 1202 to generate and transmit reference signals that enable the OAM receiver 1206 to detect and/or correct misalignment with the OAM transmitter 1202. As used herein, such reference signals may be referred to as "misalignment tracking reference signals" or "misalignment tracking RSs," but may also be referred to by other names.

As shown in FIG. 12A, the OAM transmitter 1202 transmits a first RS 1210 and a second RS 1212. The first RS 1210 and the second RS 1212 may be separated in a time-domain and/or a frequency-domain. For example, FIG. 12A includes an example slot 1230 including a plurality of symbols. As shown in FIG. 12A, the slot 1230 includes at least a first symbol 1232, a second symbol 1234, and a third symbol 1236. In some examples, the first RS 1210 may be transmitted and received at the first symbol 1232 and the second RS 1212 may be transmitted and received at a second, consecutive symbol (e.g., the second symbol 1234). In some examples, the first RS 1210 may be transmitted and received at the first symbol 1232 and the second RS 1212 may be transmitted and received at a second, non-consecutive symbol (e.g., the third symbol 1236). In some examples, the second RS 1212 may be a repetition of the first RS 1210. In some examples, the first RS 1210 may include a first helical phase structure, and the second RS 1212 may include a second helical phase structure. For example, the second helical phase structure may be based on an opposite rotational direction of the first helical phase structure, as described above in connection with FIG. 11.

In some examples, to facilitate tracking and correcting spatial (e.g., horizontal and/or vertical) misalignment for wireless communication based on OAM transmissions, the OAM receiver 1206 may measure phases for antenna elements based on the received reference signals. For example, the OAM receiver 1206 may measure a first phase for each antenna element 1208*a*, 1208*b*, 1208*c* based on the first RS 1210. The OAM receiver 1206 may also measure a second phase for each of the antenna elements 1208*a*, 1208*b*, 1208*c* based on the second RS 1212. For each of the antenna elements 1208*a*, 1208*b*, 1208*c*, the OAM receiver 1206 may determine an angle relative to an optical center. In some examples, the OAM receiver 1206 may determine the angle based on the first phase and the conjugate of the second phase at each of the antenna elements. For example, the OAM receiver 1206 may determine a first angle based on the measured first phase at the first antenna element 1208*a* and the conjugate of the measured second phase at the first antenna element 1208*a*. In a similar manner, the OAM receiver 1206 may determine a second angle for the second antenna element 1208*b* and a third angle for the third antenna element 1208*c*. The OAM receiver 1206 may determine the optical center based on the determined angle for each of the antenna elements 1208*a*, 1208*b*, 1208*c* and spatial coordinates for each of the respective antenna elements 1208*a*, 1208*b*, 1208*c*. The misalignment may correspond to a displacement size and direction relative to the optical center for each of the antenna elements 1208*a*, 1208*b*, 1208*c*.

The OAM receiver 1206 may then take an action to correct the misalignment. In some examples, the OAM receiver 1206 may physically move the antenna array 1208. For example, FIG. 12B depicts the example 1250 of the OAM transmitter 1202 in communication with the OAM receiver 1206 via OAM transmission at a second time. In the illustrated examples of FIGS. 12A and 12B, the OAM receiver 1206 includes a motor 1220 that may be configured to adjust the antenna array 1208. For example, the motor 1220 may rotate the antenna array 1208 and/or the OAM receiver 1206 to adjust the angles between the OAM transmitter 1202 and the OAM receiver 1206. As shown in FIG.

12B, the OAM transmitter 1202 may transmit an OAM transmission 1252 that is received by the OAM receiver 1206. The OAM receiver 1206 may receive the OAM transmission 1252 at the antenna elements 1208a, 1208b, 1208c. However, the spatial positioning of at least one of the antenna elements 1208a, 1208b, 1208c at the second time (as shown in FIG. 12B) is different relative to the spatial positioning of the antenna elements 1208a, 1208b, 1208c at the first time (as shown in FIG. 12A). That is, while the OAM receiver 1206 may receive the OAM transmission 1252 using the same antenna elements at the first time and the second time, the spatial positioning of the antenna elements 1208a, 1208b, 1208c at the second time may correct the misalignment between the OAM transmitter 1202 and the OAM receiver 1206, as determined by the OAM receiver 1206. Thus, the correction of the misalignment may improve communication performance between the OAM transmitter 1202 and the OAM receiver 1206 by, for example, improving reliability.

In some examples, the OAM receiver 1206 may select a different set of antenna elements for reception. For example, FIG. 12C depicts the example 1260 of the OAM transmitter 1202 in communication with the OAM receiver 1206 via OAM transmission at the third time. As shown in FIG. 12C, the OAM transmitter 1202 may transmit an OAM transmission 1262 that is received by the OAM receiver 1206. The OAM receiver 1206 may receive the OAM transmission 1252 at the antenna elements 1208d, 1208e, 1208f. In some examples, reception of the OAM transmission 1262 at the antenna elements 1208d, 1208e, 1208f may correct the misalignment between the OAM transmitter 1202 and the OAM receiver 1206. That is, using different antenna elements to receive the OAM transmission 1262 may correct the misalignment between the OAM transmitter 1202 and the OAM receiver 1206, as determined by the OAM receiver 1206. Thus, the correction of the misalignment may improve communication performance between the OAM transmitter 1202 and the OAM receiver 1206 by, for example, improving reliability.

In some examples, the OAM receiver 1206 may mechanically move the antenna array so that the activated antenna elements align with the OAM transmitter 1202 to correct the misalignment and to receive the OAM transmission, as described in connection with FIG. 12B. In some examples, the OAM receiver 1206 may activate a second subset of antenna elements that correspond to the misalignment to receive the OAM transmission, as described in connection with FIG. 12C. In some examples, the OAM receiver 1206 may mechanically move the antenna array and activate a second subset of antenna elements to correct the misalignment between the OAM transmitter 1202 and the OAM receiver 1206 to receive the OAM transmission.

Figure 13:
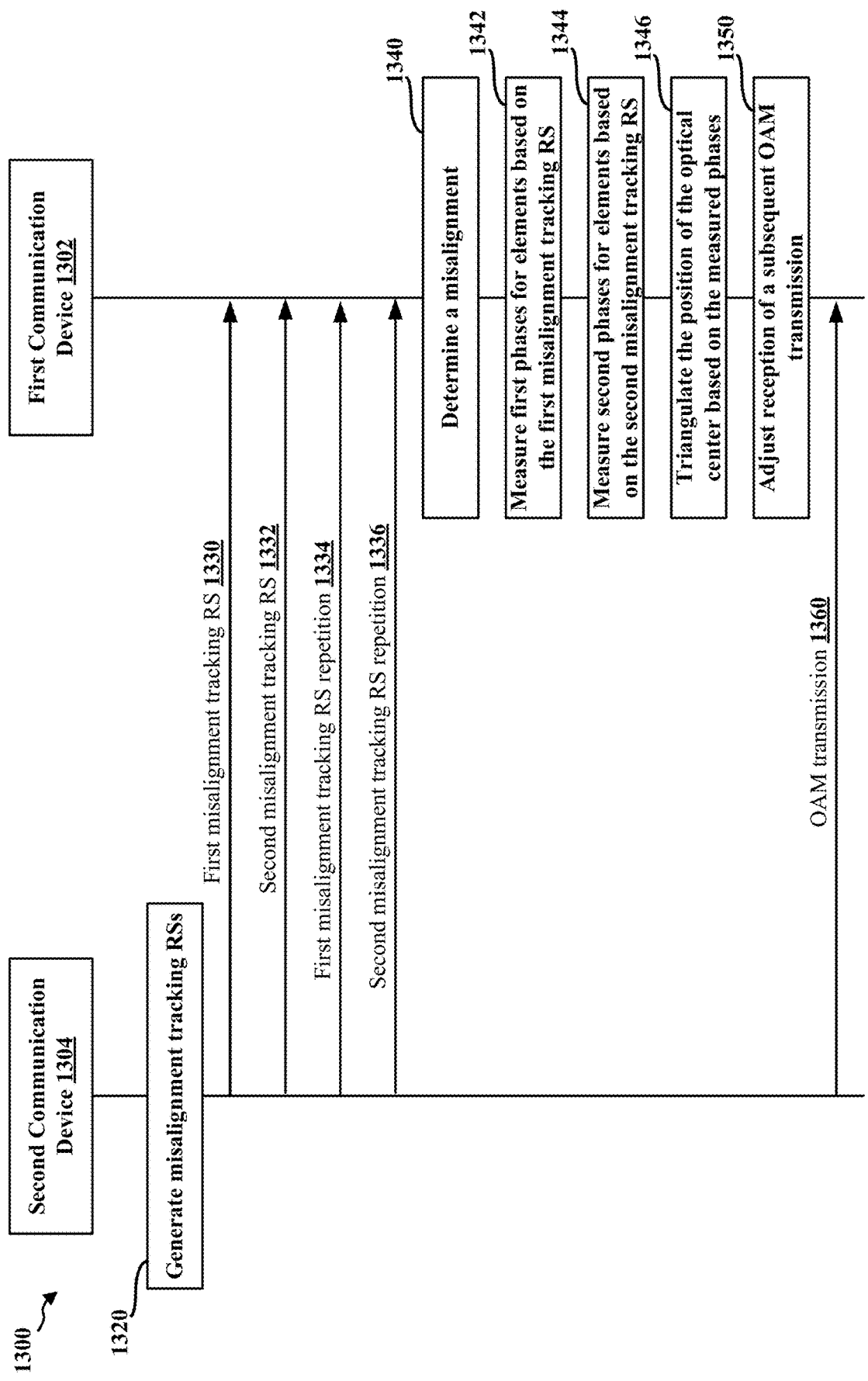
FIG. 13 is an example communication flow between a first communication device and a second communication device, in accordance with the teachings disclosed herein.

FIG. 13 illustrates an example communication flow 1300 between a first communication device 1302 and a second communication device 1304, as presented herein. In the illustrated example, the communication flow 1300 facilitates the first communication device 1302 tracking misalignment of OAM transmissions.

Although not shown in the illustrated example of FIG. 13, it may be appreciated that in additional or alternative examples, the first communication device 1302 and/or the second communication device 1304 may be in communication with one or more other communication devices.

Aspects of the communication devices 1302, 1304 may be implemented by the UE 104 of FIG. 1, the UE 350 of FIG. 3, the base station 102/180 of FIG. 1, and/or the base station 310 of FIG. 3. For example, in some examples, the communication between the first communication device 1302 and the second communication device 1304 may comprise a downlink transmission. In some such examples, the first communication device 1302 may comprise a UE and the second communication device 1304 may comprise a base station. In some examples, the communication between the first communication device 1302 and the second communication device 1304 may comprise an uplink transmission. In some such examples, the second communication device 1304 may comprise a UE and the first communication device 1302 may comprise a base station. In some examples, the communication between the first communication device 1302 and the second communication device 1304 may comprise a sidelink transmission. In some such examples, the first communication device 1302 may comprise a first sidelink device and the second communication device 1304 may comprise a second sidelink device (e.g., the first communication device 1302 and the second communication device 1304 may both be UEs). In some examples, at least one of the first communication device 1302 or the second communication device 1304 may comprise an IAB node. For example, the other communication device may be a parent node, a child node, a UE, a base station, etc.

In the illustrated example of FIG. 13, the second communication device 1304 generates, at 1320, misalignment tracking reference signals. For example, the second communication device 1304 may generate a first misalignment tracking RS 1330 and a second misalignment tracking RS 1332. The first misalignment tracking RS 1330 may comprise a first helical phase structure and the second misalignment tracking RS 1332 may comprise a second helical phase structure. In some examples, the second helical phase structure is based on an opposite rotational direction of the first helical phase structure. For example, the first misalignment tracking RS 1330 may comprise the first helical structure 412 of FIG. 4 and the second misalignment tracking RS 1332 may comprise the second helical structure 414 of FIG. 4. In some examples, the first misalignment tracking RS 1330 may be based on a topological charge of m=1 and the second misalignment tracking RS 1332 may be based on a topological charge of m=−1.

The second communication device 1304 transmits the first misalignment tracking RS 1330 that is received by the first communication device 1302. The second communication device 1304 also transmits the second misalignment tracking RS 1332 that is received by the first communication device 1302. In some examples, the first misalignment tracking RS 1330 and the second misalignment tracking RS 1332 may be separated in at least one of a time-domain and a frequency-domain. For example, the second communication device 1304 may transmit (and the first communication device 1302 may receive) the first misalignment tracking RS 1330 at a first symbol. The second communication device 1304 may transmit (and the first communication device 1302 may receive) the second misalignment tracking RS 1332 at a second, consecutive symbol.

In some examples, the second communication device 1304 may transmit one or more repetitions of the misalignment tracking reference signals. For example, the second communication device 1304 may transmit a first misalignment tracking RS repetition 1334 that is received by the first communication device 1302. The second communication device 1304 may transit a second misalignment tracking RS repetition 1336 that is received by the first communication device 1302.

The example first communication device 1302 uses, at 1340, the misalignment tracking reference signals to determine a misalignment. For example, the first communication device 1302 may use the misalignment tracking RSs 1330, 1332 and/or the misalignment tracking RS repetitions 1334, 1336 to determine the displacements Δx and Δy between the activated antenna element and the antenna elements at the locations corresponding to the received misaligned OAM beams.

In the illustrated example, the first communication device 1302 measures, at 1342, first phases for elements based on the first misalignment tracking RS 1330. The first communication device 1302 selects a subset of the activated antenna elements to measure the first phases based on the first misalignment tracking RS 1330. For example, the first communication device 1302 may select at least three non-co-linear antenna elements of the activated antenna elements to measure the first phases. The first communication device 1302 may select at least three non-co-linear elements to measure the first phases based on the topological charge m of the first misalignment tracking RS 1330. For example, based on Equation 2 (above), the first communication device 1302 may use at least three non-co-linear antenna elements to determine the misalignment for misalignment tracking reference signals with a topological charge m=1 or topological charge m=−1. However, in other examples, the quantity of elements may depend on the configuration of antenna elements at the receiver. For example, the first communication device 1302 may have the capability to determine the misalignment for misalignment tracking reference signals using one antenna element, two antenna elements, or more antenna elements. In some examples, a level of accuracy with respect to the determined misalignment may depend on the quantity of antenna elements selected for which to measure the first phases. In some examples, the first communication device 1302 may apply Equation 3 below to measure the first phase for each of the selected subset of antenna elements based on the first misalignment tracking RS 1330.

$$\Psi_{m=1} = e^{i\alpha} e^{i\theta} \qquad \text{Equation 3:}$$

In Equation 3, the parameter "α" represents aspects such as distance and/or other implementation aspects. A graphical representation 1100 of Equation 3 is depicted at 1110 of FIG. 11.

In the illustrated example, the first communication device 1302 measures, at 1344, second phases for elements based on the second misalignment tracking RS 1332. The first communication device 1302 uses the selected activated antenna elements to measure the second phases based on the second misalignment tracking RS 1332. In some examples, the first communication device 1302 may apply Equation 4 below to measure the second phase for each of the selected subset of antenna elements based on the second misalignment tracking RS 1332.

$$\Psi_{m=-1} = e^{i\alpha} e^{-i\theta} \qquad \text{Equation 4:}$$

In Equation 4, the parameter "α" represents aspects such as distance and/or other implementation aspects. A graphical representation of Equation 4 is depicted at 1120 of FIG. 11.

It may be appreciated that the first term "$e^{i\alpha}$" of the Equations 3 and 4 may be the same for the topological charge of m=1 (e.g., as shown in Equation 3) and for the topological charge of m=−1 (e.g., as shown in Equation 4). In some examples, to remove the first term "$e^{i\alpha}$" from the calculations, the first communication device 1302 may multiply the phase for m=1 ($\Psi_{m=1}$) and the conjugate of the phase for m=−1 ($\Psi_{m=-1}$*) for each of the selected subset of antenna elements. Phase conjugation refers to a transformation in which the propagation direction is reversed, but the amplitude and phase are the same. Thus, by multiplying a beam with the conjugate of the beam results in the first term "$e^{i\alpha}$" of Equations 3 and 4 to cancel each other so that the firm term may be removed. For example, the first communication device 1302 may apply Equation 5 below to obtain the value "2θ."

$$\Psi_{m=1} * \Psi_{m=-i} * e^{i2\theta} \qquad \text{Equation 5:}$$

Figure 11:
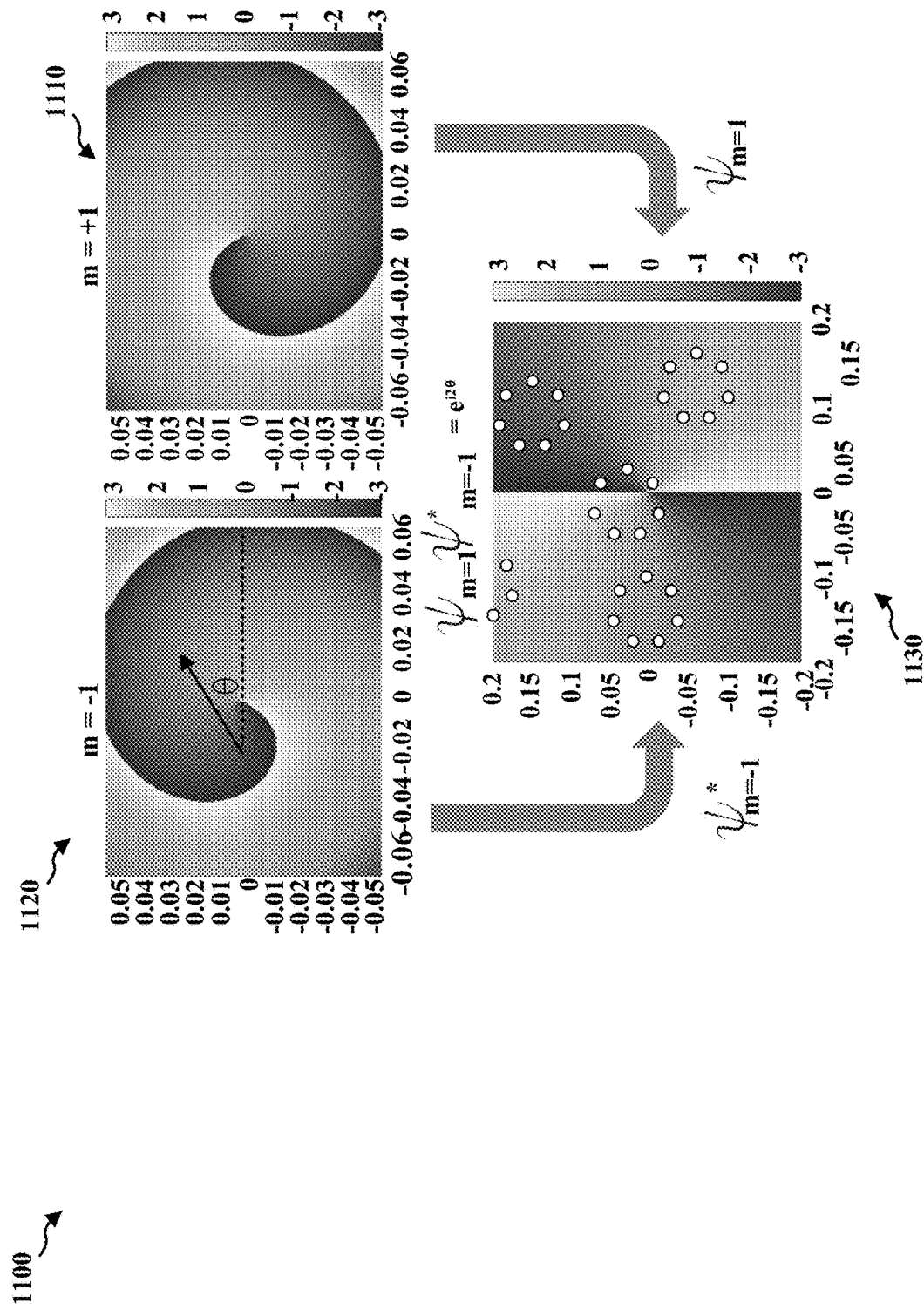
FIG. 11 depicts a graphical representation of phase measurements for a first helical structure and a second helical structure having an opposite rotational direction as the first helical structure.

A graphical representation of Equation 5 is depicted at 1130 of FIG. 11.

The first communication device 1302 may use the measured phases to triangulate, at 1346, the position of the optical center. For example, for each selected subject of the antenna elements, the first communication device may know the spatial coordinates (x, y) antenna element and the phase "θ." For example, for an antenna element k, the first communication device 1302 may use the spatial coordinates of the antenna element k (e.g., a ($x_k$, $y_k$)). The first communication device may then apply Equation 6 for each of the selected subset of antenna elements to triangulate the position of the center.

$$\tan(\theta_k) = \frac{y_k + \Delta y}{x_k + \Delta x} \qquad \text{Equation 6}$$

In Equation 6, the term "$\theta_k$" represents the phase of the antenna element k, the term "$y_k$" represents the y-spatial coordinate of the antenna element k, the term "$x_k$" represents the x-spatial coordinate of the antenna element k, the term "Δy" represents the displacement in the y-direction between the transmitter and the receiver, and the term "Δx" represents the y-spatial coordinate of the antenna element k.

It may be appreciated that for each antenna element k, the phase of the antenna element $\theta_k$, the y-spatial coordinate $y_k$, and the x-spatial coordinate $x_k$ is known. Thus, two unknowns Δx, Δy remain. However, it may be appreciated that the unknowns Δx, Δy are not based on the antenna element k. Thus, by applying Equation 6 to at least three non-co-linear antenna elements, the first communication device 1302 may determine the misalignment between the transmitter and the receiver based on the displacements Δx, Δy. That is, the first communication device 1302 may solve discrepancies originating by the 4π phase rotation by utilizing (or applying) Equation 6 for each of the selected subset of the antenna elements.

At 1350, the first communication device 1302 adjusts reception of a subsequent OAM transmission based on the misalignment. For example, the second communication device 1304 may transmit an OAM transmission 1360 that is received by the first communication device 1302. In some examples, the first communication device 1302 may activate a second subset of antenna elements that correspond to the misalignment to receive the OAM transmission 1360, as described in the example of FIG. 12C. In some examples, the first communication device 1302 may mechanically move the antenna array so that the activated antenna elements align with the second communication device 1304 to correct the misalignment and to receive the OAM transmission 1360, as described in the example of FIG. 12B. In some examples, the first communication device 1302 may mechanically move the antenna array and activate a second subset of antenna elements to correct the misalignment between the second communication device 1304 and the first communication device 1302 and to receive the OAM transmission 1360.

In some examples, the first communication device 1302 may adjust reception of a subsequent OAM transmission based on a determination that the misalignment is less than an amount. For example, when the misalignment is less than a threshold amount, the first communication device 1302 may adjust reception of the subsequent OAM transmission based on the misalignment. However, when the misalignment is greater than the threshold amount, in one example, the first communication device 1302 may forego making an adjustment to facilitate reception of the subsequent OAM transmission.

In some examples, a level of accuracy with respect to the determined misalignment may depend on the quantity of antenna elements selected for which to measure the first phases. For example, for the misalignment tracking RSs 1330, 1332 comprising a topological charge m=1 or topological charge m=−1, the first communication device 1302 may associate a first level of determined misalignment accuracy when the subset of antenna elements comprises at least three antenna elements, and may associate a second level of determined misalignment accuracy when the subset of antenna elements comprises less than three antenna elements. In some examples, the first communication device 1302 may adjust, at 1350, reception of the OAM transmission 1360 based on the level of determined misalignment accuracy. For example, for a first level of determined misalignment accuracy, the first communication device 1302 may activate the second subset of antenna elements that correspond to the misalignment to receive the OAM transmission 1360. For a second level of determined misalignment accuracy, the first communication device 1302 may activate a third subset of antenna elements that correspond to the misalignment to receive the OAM transmission 1360. In some examples, the third subset of antenna elements may include the antenna elements of the second subset of antenna elements and one or more additional antenna elements. For example, for each antenna element of the second subset of antenna elements, the first communication device 1302 may select one or more surrounding antenna elements to improve alignment for receiving a subsequent OAM transmission (e.g., the OAM transmission 1360). That is, in this example, since using less than three antenna elements may result in a reduced accuracy level of the determined misalignment, the first communication device 1302 may increase the quantity of activated antenna elements to facilitate improving reception of a subsequent OAM transmission (e.g., the OAM transmission 1360).

Although the above example provides a first level and a second level of determined misalignment accuracy, other examples may employ additional or alternate quantities of levels. For example, based on the above example in which the misalignment tracking RSs 1330, 1332 comprise a topological charge m=1 or topological charge m=−1, the first communication device 1302 may associate a first level of determined misalignment accuracy when the subset of antenna elements includes less than three antenna elements, may associate a second level of determined misalignment accuracy when the subset of antenna elements includes three antenna elements, and may associate a third level of determined misalignment accuracy when the subset of antenna elements includes more than three antenna elements. In some such examples, the adjustment, at 1350, that the first communication device 1302 makes to receive the OAM transmission 1360 may depend on the level of determined misalignment accuracy.

Figure 14:
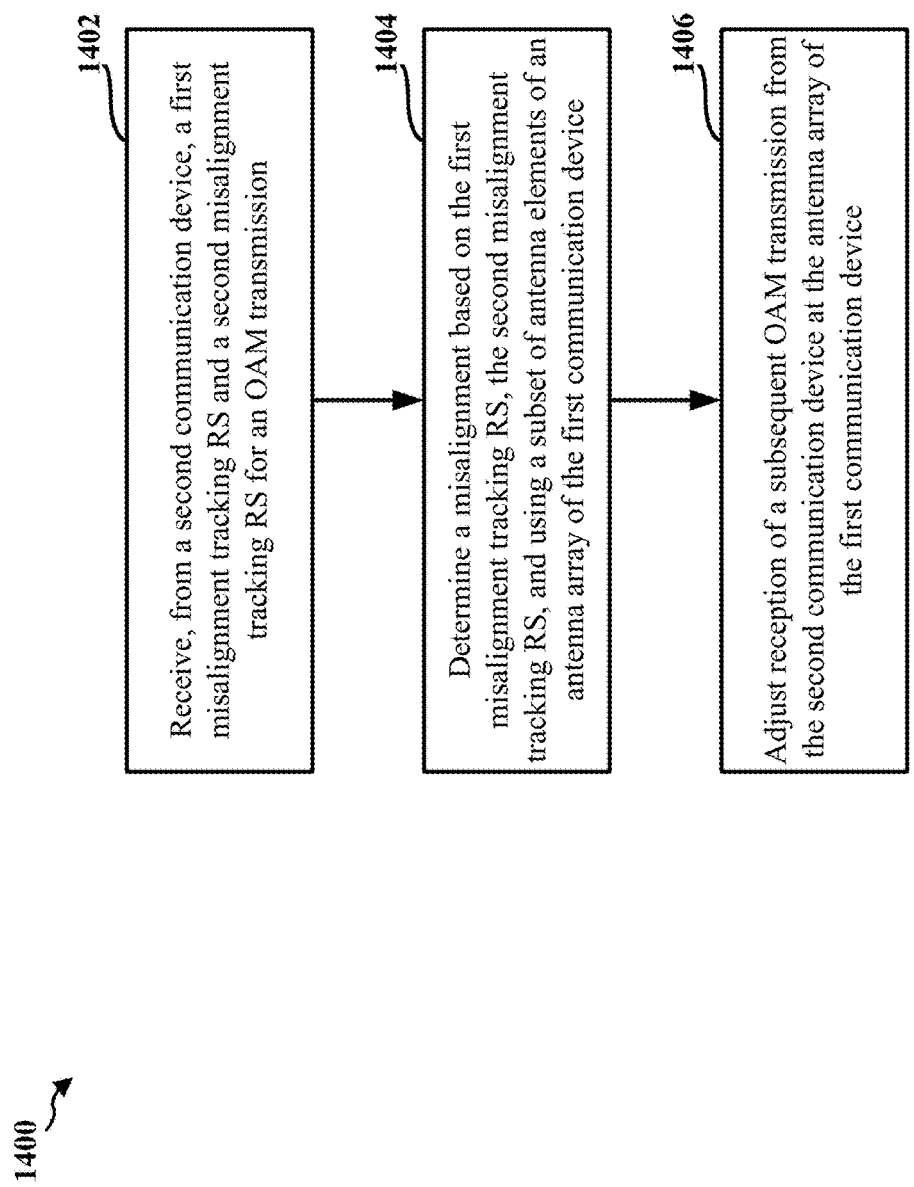
FIG. 14 is a flowchart of a method of wireless communication at a first communication device, in accordance with the teachings disclosed herein.

FIG. 14 is a flowchart 1400 of a method of wireless communication. The method may be performed by a first communication device (e.g., the UE 104, the UE 350, the first communication device 1302, and/or an apparatus 1602 of FIG. 16). Optional aspects are illustrated with a dashed line. The method may facilitate tracking and correcting misalignment of OAM transmissions.

In some examples, the communication between the first communication device and the second communication device may comprise a downlink transmission. In some such examples, the first communication device may comprise a UE and the second communication device may comprise a base station. In some examples, the communication between the first communication device and the second communication device may comprise an uplink transmission. In some such examples, the second communication device may comprise a UE and the first communication device may comprise a base station. In some examples, the communication between the first communication device and the second communication device may comprise a sidelink transmission. In some such examples, the first communication device may comprise a first sidelink device and the second communication device may comprise a second sidelink device. In some examples, at least one of the first communication device or the second communication device may comprise an IAB node.

At 1402, the first communication device receives, from a second communication device, a first misalignment tracking reference signal and a second misalignment tracking RS for an OAM transmission, as described in connection with the first misalignment tracking RS 1330 and the second misalignment tracking RS 1332 of FIG. 13. For example, 1402 may be performed by a misalignment tracking RS component 1640 of the apparatus 1602 of FIG. 16. In some examples, the first communication device may receive the first misalignment tracking RS at a first symbol and may receive the second misalignment tracking RS at a second, consecutive symbol.

In some examples, the first misalignment tracking RS comprises a first helical phase structure and the second misalignment tracking RS comprises a second helical phase structure. In some examples, the second helical phase structure may be based on an opposite rotational direction of the first helical phase structure. For example, the first misalignment tracking RS may be based on a topological charge of m=1 and the second misalignment tracking RS may be based on a topological chart of m=−1. In some examples, the first misalignment tracking RS and the second misalignment tracking RS may be separated in at least one of a time-domain and a frequency-domain.

At 1404, the first communication device determines a misalignment based on the first misalignment tracking RS, the second misalignment tracking RS, and using a subset of antenna elements of an antenna array of the first communication device, as described in connection with 1340 of FIG. 13. For example, 1404 may be performed by a misalignment determination component 1642 of the apparatus 1602 of FIG. 16. In some examples, the subset of the antenna elements of the antenna array may comprise at least three non-co-linear antenna elements. However, it may be appreciated that the quantity of antenna elements of the subset of the antenna elements of the antenna array may be based on the configuration of the antenna elements at the receiver. Additionally, or alternatively, in some examples, the first communication device may determine the quantity of antenna elements to include in the subset of the antenna elements of the antenna array based on Equation 2 (above).

In some examples, the first communication device may determine the misalignment based on measurements associated with the misalignment tracking RSs and a subset of antenna elements of the first communication device.

At 1406, the first communication device adjusts reception of a subsequent OAM transmission from the second communication device at the antenna array of the first communication device, as described in connection with 1350 of FIG. 13. For example, 1406 may be performed by an adjustment component 1644 of the apparatus 1602 of FIG. 16.

In some examples, the first communication device may adjust the reception to correct the misalignment based on the misalignment being less than a particular amount, such as within a threshold amount. In some examples, the first communication device may forego adjusting reception of the subsequent OAM transmission to correct for the misalignment if the misalignment is more than the particular amount (e.g., greater than the threshold amount).

In some examples, the first communication device may adjust reception of the subsequent OAM by activating a second subset of the antenna elements of the antenna array based on the misalignment, as described in connection with 1260 of FIG. 12C and/or 1350 of FIG. 13.

In some examples, the first communication device may adjust reception of the subsequent OAM by mechanically moving the antenna array relative to the second communication device, as described in connection with 1250 of FIG. 12B and/or 1350 of FIG. 13.

Figure 15:
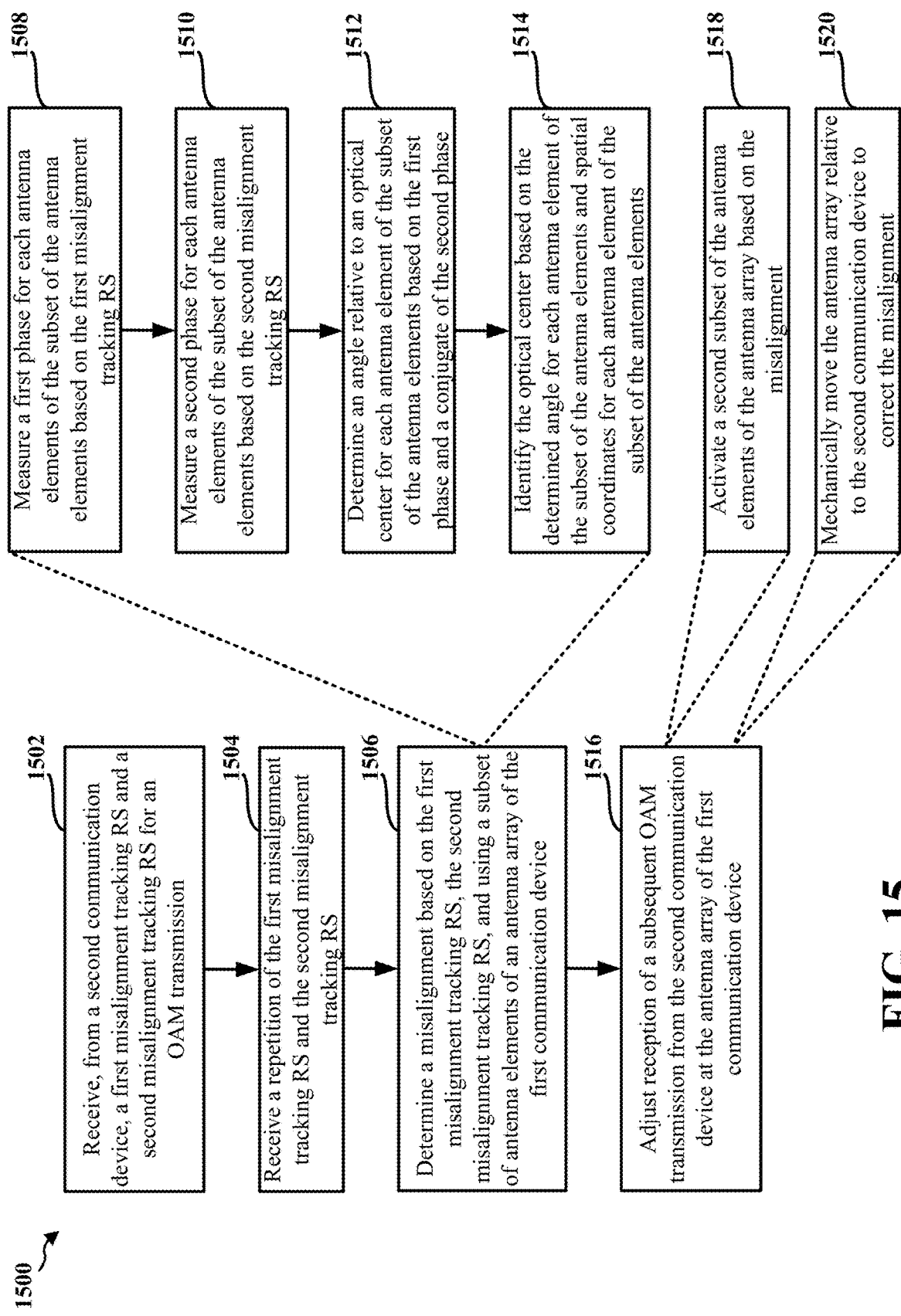
FIG. 15 is a flowchart of a method of wireless communication at a first communication device, in accordance with the teachings disclosed herein.

FIG. 15 is a flowchart 1500 of a method of wireless communication. The method may be performed by a first communication device (e.g., the UE 104, the UE 350, the first communication device 1302, and/or an apparatus 1602 of FIG. 16). Optional aspects are illustrated with a dashed line. The method may facilitate tracking and correcting misalignment of OAM transmissions.

In some examples, the communication between the first communication device and the second communication device may comprise a downlink transmission. In some such examples, the first communication device may comprise a UE and the second communication device may comprise a base station. In some examples, the communication between the first communication device and the second communication device may comprise an uplink transmission. In some such examples, the second communication device may comprise a UE and the first communication device may comprise a base station. In some examples, the communication between the first communication device and the second communication device may comprise a sidelink transmission. In some such examples, the first communication device may comprise a first sidelink device and the second communication device may comprise a second sidelink device. In some examples, at least one of the first communication device or the second communication device may comprise an IAB node.

At 1502, the first communication device receives, from a second communication device, a first misalignment tracking reference signal and a second misalignment tracking RS for an OAM transmission, as described in connection with the first misalignment tracking RS 1330 and the second misalignment tracking RS 1332 of FIG. 13. For example, 1502 may be performed by a misalignment tracking RS component 1640 of the apparatus 1602 of FIG. 16. In some examples, the first communication device may receive the first misalignment tracking RS at a first symbol and may receive the second misalignment tracking RS at a second, consecutive symbol.

In some examples, the first misalignment tracking RS comprises a first helical phase structure and the second misalignment tracking RS comprises a second helical phase structure. In some examples, the second helical phase structure may be based on an opposite rotational direction of the first helical phase structure. For example, the first misalignment tracking RS may be based on a topological charge of m=1 and the second misalignment tracking RS may be based on a topological chart of m=−1. In some examples, the first misalignment tracking RS and the second misalignment tracking RS may be separated in at least one of a time-domain and a frequency-domain.

At 1504, the first communication device may receive a repetition of the first misalignment tracking RS and the second misalignment tracking RS from the second communication device, as described in connection with the first misalignment tracking RS repetition 1334 and the second misalignment tracking RS repetition 1336 of FIG. 13. For example, 1504 may be performed by a repetition component 1646 of the apparatus 1602 of FIG. 16. In some such examples, the first communication device may determine the misalignment (e.g., at 1506) using the repetition.

At 1506, the first communication device determines a misalignment based on the first misalignment tracking RS, the second misalignment tracking RS, and using a subset of antenna elements of an antenna array of the first communication device, as described in connection with 1340 of FIG. 13. For example, 1506 may be performed by a misalignment determination component 1642 of the apparatus 1602 of FIG. 16. In some examples, the subset of the antenna elements of the antenna array may comprise at least three non-co-linear antenna elements. However, it may be appreciated that the quantity of antenna elements of the subset of the antenna elements of the antenna array may be based on the configuration of the antenna elements at the receiver. Additionally, or alternatively, in some examples, the first communication device may determine the quantity of antenna elements to include in the subset of the antenna elements of the antenna array based on Equation 2 (above).

In some examples, the first communication device may determine the misalignment based on measurements associated with the misalignment tracking RSs and a subset of antenna elements of the first communication device. For example, at 1508, the first communication device may measure a first phase for each antenna element of the subset of the antenna elements based on the first misalignment tracking RS, as described in connection with 1342 of FIG. 13. For example, 1508 may be performed by a phase measurement component 1648 of the apparatus 1602 of FIG. 16. In some examples, the first communication device may apply Equation 3 above to measure the first phase for each antenna elements of the subset of the antenna elements based on the first misalignment tracking RS.

At 1510, the first communication device may measure a second phase for each antenna element of the subset of the antenna elements based on the second misalignment tracking RS, as described in connection with 1344 of FIG. 13. For example, 1510 may be performed by the phase measurement component 1648 of the apparatus 1602 of FIG. 16. In some examples, the first communication device may apply Equation 4 above to measure the second phase for each antenna elements of the subset of the antenna elements based on the second misalignment tracking RS.

At 1512, the first communication device may determine an angle relative to an optical center for each antenna element of the subset of the antenna elements based on the first phase and a conjugate of the second phase, as described in connection with 1346 of FIG. 13. For example, 1512 may be performed by an angle determination component 1650 of the apparatus 1602 of FIG. 16. In some examples, the first communication device may apply Equation 5 above to determine the angle relative to the optical center for each antenna element of the subset of the antenna elements.

At 1514, the first communication device may identify the optical center based on the determined angle for each antenna element of the subset of the antenna elements and spatial coordinates for each antenna element of the subset of the antenna elements, as described in connection with 1346 of FIG. 13. For example, 1514 may be performed by an optical center component 1652 of the apparatus 1602 of FIG. 16. In some examples, the misalignment may correspond to a displacement size and direction relative to the optical center for each antenna element of the subset of the antenna elements. In some examples, the first communication device may apply Equation 6 above to identify the optical center based on the determined angle for each antenna element of the subset of the antenna elements and spatial coordinates for each antenna element of the subset of the antenna elements.

At 1516, the first communication device adjusts reception of a subsequent OAM transmission from the second communication device at the antenna array of the first communication device, as described in connection with 1350 of FIG. 13. For example, 1516 may be performed by an adjustment component 1644 of the apparatus 1602 of FIG. 16.

In some examples, the first communication device may adjust reception of the subsequent OAM by, at 1518, activating a second subset of the antenna elements of the antenna array based on the misalignment, as described in connection with 1260 of FIG. 12C and/or 1350 of FIG. 13. For example, 1518 may be performed by an activation component 1654 of the apparatus 1602 of FIG. 16.

In some examples, the first communication device may adjust reception of the subsequent OAM by, at 1520, mechanically moving the antenna array relative to the second communication device, as described in connection with 1250 of FIG. 12B and/or 1350 of FIG. 13. For example, 1520 may be performed by a mechanical movement component 1656 of the apparatus 1602 of FIG. 16.

Figure 16:
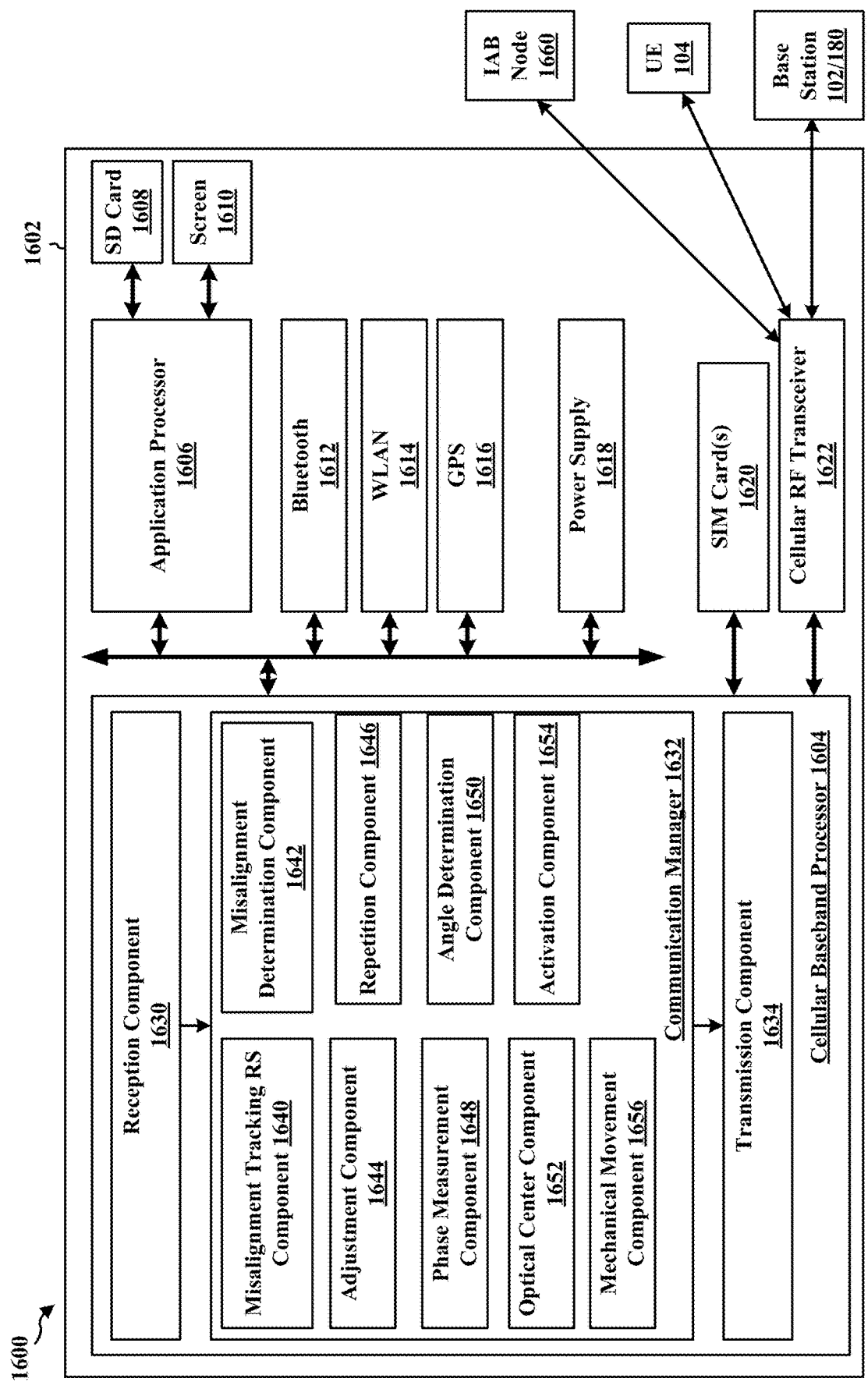
FIG. 16 is a diagram illustrating an example of a hardware implementation for an example apparatus, in accordance with the teachings disclosed herein.

FIG. 16 is a diagram 1600 illustrating an example of a hardware implementation for an apparatus 1602 that is configured to perform the aspects described in connection with FIG. 14 and/or 15. The apparatus may be referred to as a receiving device or a receiver, but may have the capability to transmit and receive. In some examples, the apparatus 1602 may be a UE. In other examples, the apparatus 1602 may be a base station. In other examples, the apparatus 1602 may be an IAB node. The apparatus 1602 may include a cellular baseband processor 1604 (also referred to as a modem) coupled to a cellular RF transceiver 1622. In some aspects, the apparatus 1602 may further include one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, or a power supply 1618. The cellular baseband processor 1604 communicates through the cellular RF transceiver 1622 with the UE 104, the base station 102/180, and/or an IAB node 1660. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the UE 350 and may include the memory 360 and/or at least one of the TX processor 368, the RX processor 356, and the controller/processor 359. In one configuration, the apparatus 1602 may be a modem chip and include just the cellular baseband processor 1604, and in another configuration, the apparatus 1602 may be the entire UE (e.g., see the UE 350 of FIG. 3) and include the additional modules of the apparatus 1602.

The communication manager 1632 includes a misalignment tracking RS component 1640 that is configured to receive, from a second communication device, a first misalignment tracking reference signal and a second misalignment tracking RS for an OAM transmission, for example, as described in connection with 1402 of FIGS. 14 and/or 1502 of FIG. 15.

The communication manager 1632 also includes a misalignment determination component 1642 that is configured to determine a misalignment based on the first misalignment tracking RS, the second misalignment tracking RS, and using a subset of antenna elements of an antenna array of the first communication device, for example, as described in connection with 1404 of FIGS. 14 and/or 1506 of FIG. 15.

The communication manager 1632 also includes an adjustment component 1644 that is configured to adjust reception of a subsequent OAM transmission from the second communication device at the antenna array of the first communication device, for example, as described in connection with 1406 of FIGS. 14 and/or 1516 of FIG. 15.

The communication manager 1632 also includes a repetition component 1646 that is configured to receive a repetition of the first misalignment tracking RS and the second misalignment tracking RS from the second communication device, for example, as described in connection with 1504 of FIG. 15.

The communication manager 1632 also includes a phase measurement component 1648 that is configured to measure a first phase for each antenna element of the subset of the antenna elements based on the first misalignment tracking RS, for example, as described in connection with 1508 of FIG. 15 and/or measure a second phase for each antenna element of the subset of the antenna elements based on the second misalignment tracking RS, for example, as described in connection with 1510 of FIG. 15.

The communication manager 1632 also includes an angle determination component 1650 that is configured to determine an angle relative to an optical center for each antenna element of the subset of the antenna elements based on the first phase and a conjugate of the second phase, for example, as described in connection with 1512 of FIG. 15.

The communication manager 1632 also includes an optical center component 1652 that is configured to identify the optical center based on the determined angle for each antenna element of the subset of the antenna elements and spatial coordinates for each antenna element of the subset of the antenna elements, for example, as described in connection with 1514 of FIG. 15.

The communication manager 1632 also includes an activation component 1654 that is configured to activate a second subset of the antenna elements of the antenna array based on the misalignment, for example, as described in connection with 1518 of FIG. 15.

The communication manager 1632 also includes a mechanical movement component 1656 that is configured to mechanically move the antenna array relative to the second communication device, for example, as described in connection with 1520 of FIG. 15.

The apparatus may include additional components that perform each of the blocks of the algorithm in the flowcharts of FIGS. 14 and/or 15. As such, each block in the flowcharts of FIGS. 14 and/or 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the cellular baseband processor 1604, includes means for receiving, from a second communication device, a first misalignment tracking RS and a second misalignment tracking RS for an OAM transmission. The example apparatus 1602 also includes means for determining a misalignment based on the first misalignment tracking RS, the second misalignment tracking RS, and using a subset of antenna elements of an antenna array of the first communication device. The example apparatus 1602 also includes means for adjusting reception of a subsequent OAM transmission from the second communication device at the antenna array of the first communication device.

In another configuration, the example apparatus 1602 also includes means for receiving a repetition of the first misalignment tracking RS and the second misalignment tracking RS from the second communication device, where the first communication device determines the misalignment using the repetition.

In another configuration, the example apparatus 1602 also includes means for receiving the first misalignment tracking RS at a first symbol and receiving the second misalignment tracking RS at a second, consecutive symbol.

In another configuration, the apparatus 1602 also includes means for measuring a first phase for each antenna element of the subset of the antenna elements based on the first misalignment tracking RS. The example apparatus 1602 also includes means for measuring a second phase for each antenna element of the subset of the antenna elements based on the second misalignment tracking RS. The example apparatus 1602 also includes means for determining an angle relative to an optical center for each antenna element of the subset of the antenna elements based on the first phase and a conjugate of the second phase.

In another configuration, the example apparatus 1602 also includes means for identifying the optical center based on the determined angle for each antenna element of the subset of the antenna elements and spatial coordinates for each antenna element of the subset of the antenna elements, and where the misalignment corresponds to a displacement size and direction relative to the optical center for each antenna element of the subset of the antenna elements.

In another configuration, the example apparatus 1602 also includes means for activating a second subset of the antenna elements of the antenna array based on the misalignment.

In another configuration, the example apparatus 1602 also includes means for mechanically moving the antenna array relative to the second communication device.

The means may be one or more of the components of the apparatus 1602 configured to perform the functions recited by the means. As described supra, the apparatus 1602 may include the TX processor 368, the RX processor 356, and the controller/processor 359. As such, in one configuration, the means may be the TX processor 368, the RX processor 356, and the controller/processor 359 configured to perform the functions recited by the means.

Figure 17:
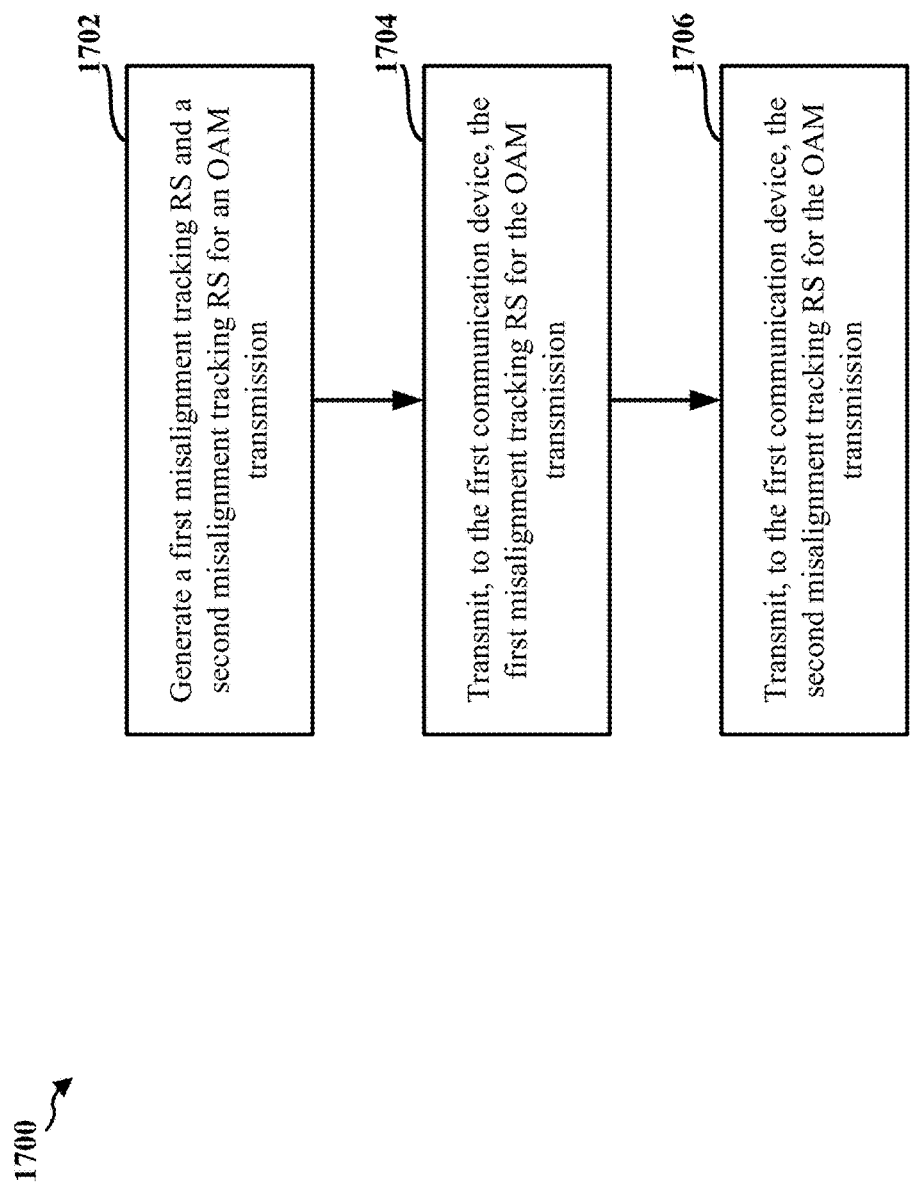
FIG. 17 is a flowchart of a method of wireless communication at a second communication device, in accordance with the teachings disclosed herein.

FIG. 17 is a flowchart 1700 of a method of wireless communication. The method may be performed by a second communication device (e.g., the base station 102/180, the base station 310, the second communication device 1304, and/or an apparatus 1902 of FIG. 19). Optional aspects are illustrated with a dashed line. The method may facilitate a first communication device receiving an OAM transmission from the second communication to track and correct misalignment of OAM transmissions.

In some examples, the communication between the first communication device and the second communication device may comprise a downlink transmission. In some such examples, the first communication device may comprise a UE and the second communication device may comprise a base station. In some examples, the communication between the first communication device and the second communication device may comprise an uplink transmission. In some such examples, the second communication device may comprise a UE and the first communication device may comprise a base station. In some examples, the communication between the first communication device and the second communication device may comprise a sidelink transmission. In some such examples, the first communication device may comprise a first sidelink device and the second communication device may comprise a second sidelink device. In some examples, at least one of the first communication device or the second communication device may comprise an IAB node.

At 1702, the second communication device generates a first misalignment tracking RS and a second misalignment tracking RS for an OAM transmission, as described in connection with 1320 of FIG. 13. For example, 1702 may be performed by a generation component 1940 of the apparatus 1902 of FIG. 19.

In some examples, the first misalignment tracking RS comprises a first helical phase structure and the second misalignment tracking RS comprises a second helical phase structure. In some examples, the second helical phase structure may be based on an opposite rotational direction of the first helical phase structure. For example, the first misalignment tracking RS may be based on a topological charge of m=1 and the second misalignment tracking RS may be based on a topological chart of m=−1. In some examples, the first misalignment tracking RS and the second misalignment tracking RS may be separated in at least one of a time-domain and a frequency-domain.

At 1704, the second communication transmits, to the first communication device, the first misalignment tracking RS for the OAM transmission, as described in connection with the first misalignment tracking RS 1330 of FIG. 13. For example, 1704 may be performed by a misalignment tracking RS component 1942 of the apparatus 1902 of FIG. 19.

At 1706, the second communication device transmits, to the first communication device, the second misalignment tracking RS for the OAM transmission, as described in connection with the second misalignment tracking RS 1332 of FIG. 13. For example, 1706 may be performed by the misalignment tracking RS component 1942 of the apparatus 1902 of FIG. 19.

In some examples, the first misalignment tracking RS and the second misalignment tracking RS may be separated in at least one of a time-domain and a frequency-domain. In some examples, the second communication device may transmit the first misalignment tracking RS at a first symbol and transmit the second misalignment tracking RS at a second, consecutive symbol.

Figure 18:
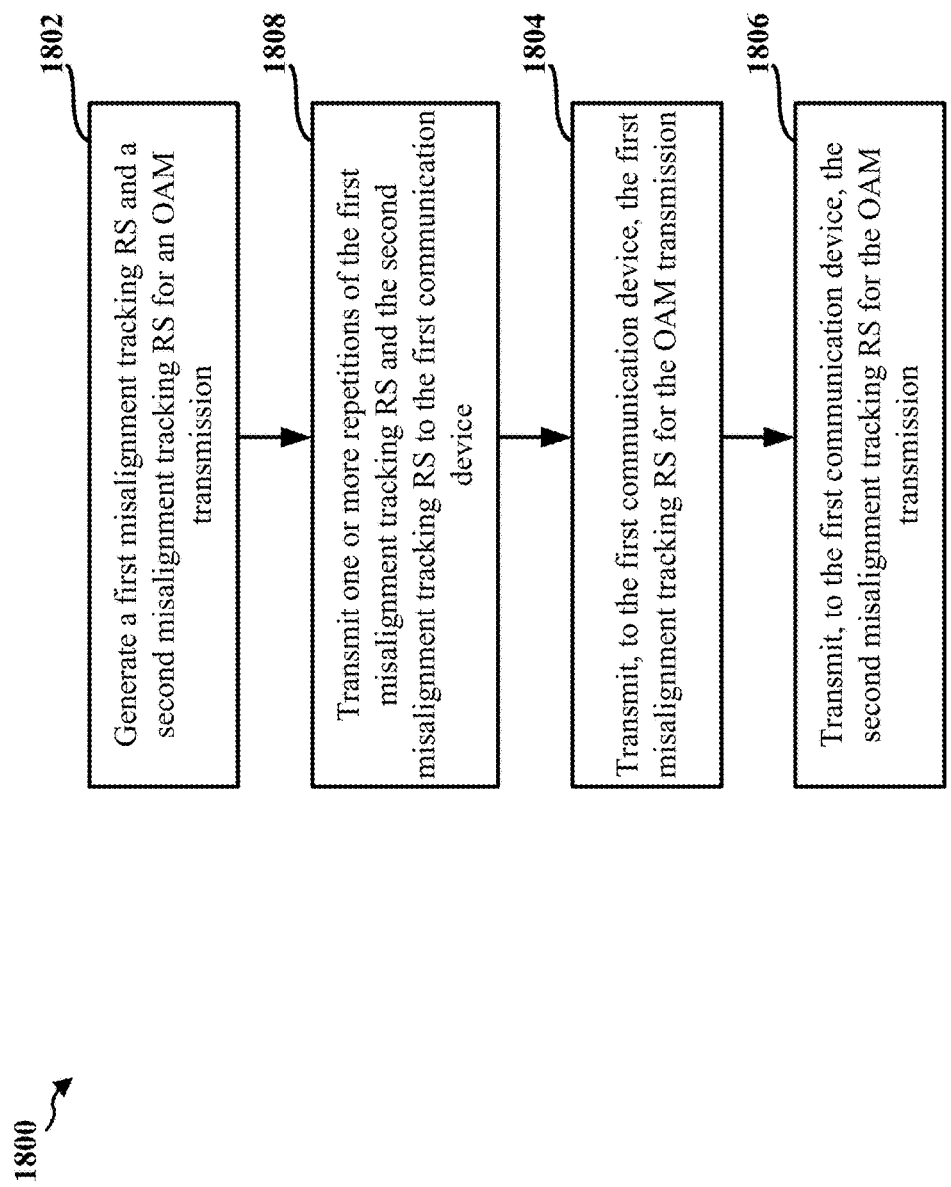
FIG. 18 is a flowchart of a method of wireless communication at a second communication device, in accordance with the teachings disclosed herein.

FIG. 18 is a flowchart 1800 of a method of wireless communication. The method may be performed by a second communication device (e.g., the base station 102/180, the base station 310, the second communication device 1304, and/or an apparatus 1902 of FIG. 19). Optional aspects are illustrated with a dashed line. The method may facilitate a first communication device receiving an OAM transmission from the second communication to track and correct misalignment of OAM transmissions.

In some examples, the communication between the first communication device and the second communication device may comprise a downlink transmission. In some such examples, the first communication device may comprise a UE and the second communication device may comprise a base station. In some examples, the communication between the first communication device and the second communication device may comprise an uplink transmission. In some such examples, the second communication device may comprise a UE and the first communication device may comprise a base station. In some examples, the communication between the first communication device and the second communication device may comprise a sidelink transmission. In some such examples, the first communication device may comprise a first sidelink device and the second communication device may comprise a second sidelink device. In some examples, at least one of the first communication device or the second communication device may comprise an IAB node.

At 1802, the second communication device generates a first misalignment tracking RS and a second misalignment tracking RS for an OAM transmission, as described in connection with 1320 of FIG. 13. For example, 1802 may be performed by a generation component 1940 of the apparatus 1902 of FIG. 19.

In some examples, the first misalignment tracking RS comprises a first helical phase structure and the second misalignment tracking RS comprises a second helical phase structure. In some examples, the second helical phase structure may be based on an opposite rotational direction of the first helical phase structure. For example, the first misalignment tracking RS may be based on a topological charge of m=1 and the second misalignment tracking RS may be based on a topological chart of m=−1. In some examples, the first misalignment tracking RS and the second misalignment tracking RS may be separated in at least one of a time-domain and a frequency-domain.

At 1804, the second communication transmits, to the first communication device, the first misalignment tracking RS for the OAM transmission, as described in connection with the first misalignment tracking RS 1330 of FIG. 13. For example, 1804 may be performed by a misalignment tracking RS component 1942 of the apparatus 1902 of FIG. 19.

At 1806, the second communication device transmits, to the first communication device, the second misalignment tracking RS for the OAM transmission, as described in connection with the second misalignment tracking RS 1332 of FIG. 13. For example, 1806 may be performed by the misalignment tracking RS component 1942 of the apparatus 1902 of FIG. 19.

In some examples, the first misalignment tracking RS and the second misalignment tracking RS may be separated in at least one of a time-domain and a frequency-domain. In some examples, the second communication device may transmit the first misalignment tracking RS at a first symbol and transmit the second misalignment tracking RS at a second, consecutive symbol.

At 1808, the second communication device may transmit one or repetitions of the first misalignment tracking RS and the second misalignment tracking RS to the first communication device, as described in connection with the first misalignment tracking RS repetition 1334 and the second misalignment tracking RS repetition 1336 of FIG. 13. For example, 1808 may be performed by a repetitions component 1944 of the apparatus 1902 of FIG. 19.

Figure 19:
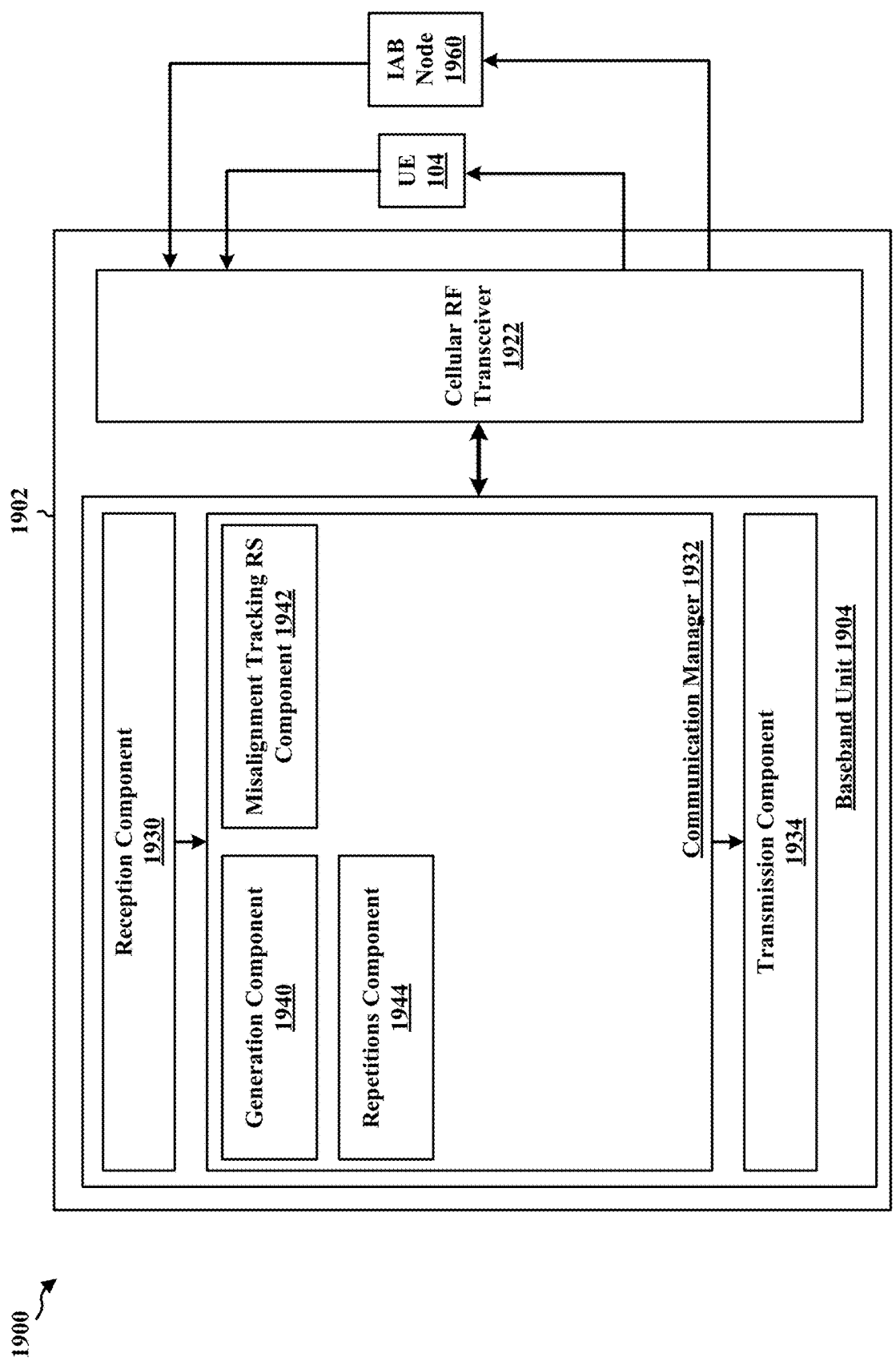
FIG. 19 is a diagram illustrating an example of a hardware implementation for an example apparatus, in accordance with the teachings disclosed herein.

FIG. 19 is a diagram 1900 illustrating an example of a hardware implementation for an apparatus 1902 that is configured to perform the aspects described in connection with FIGS. 17 and/or 18. The apparatus may be referred to as a transmitting device or a transmitter, but may have the capability to transmit and receive. In some examples, the apparatus 1902 may be a base station. In other examples, the apparatus 1902 may be an IAB node. In other examples, the apparatus 1902 may be a UE. The apparatus 1902 may include a baseband unit 1904. The baseband unit 1904 may communicate through a cellular RF transceiver 1922 with the UE 104 and/or an IAB node 1960. The baseband unit 1904 may include a computer-readable medium/memory. The baseband unit 1904 is responsible for general processing, including the execution of software stored on the computer-readable medium/memory. The software, when executed by the baseband unit 1904, causes the baseband unit 1904 to perform the various functions described supra. The computer-readable medium/memory may also be used for storing data that is manipulated by the baseband unit 1904 when executing software. The baseband unit 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the baseband unit 1904. The baseband unit 1904 may be a component of the base station 310 and may include the memory 376 and/or at least one of the TX processor 316, the RX processor 370, and the controller/processor 375.

The communication manager 1932 includes a generation component 1940 that is configured to generate a first misalignment tracking RS and a second misalignment tracking RS for an OAM transmission, for example, as described in connection with 1702 of FIGS. 17 and/or 1802 of FIG. 18.

The communication manager 1932 also includes a misalignment tracking RS component 1942 that is configured to transmit, to the first communication device, the first misalignment tracking RS for the OAM transmission, for example, as described in connection with 1704 of FIGS. 17 and/or 1804 of FIG. 18. The example misalignment tracking RS component 1942 may also be configured to transmit, to the first communication device, the second misalignment tracking RS for the OAM transmission, for example, as described in connection with 1706 of FIGS. 17 and/or 1806 of FIG. 18.

The communication manager 1932 also includes a repetitions component 1944 that is configured to transmit one or more repetitions of the first misalignment tracking RS and the second misalignment tracking RS to the first communication device, for example, as described in connection with 1808 of FIG. 18.

The apparatus may include additional components that perform each of the blocks of the algorithm in the flowcharts of FIGS. 17 and/or 18. As such, each block in the flowcharts of FIGS. 17 and/or 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1902, and in particular the baseband unit 1904, includes means for generating a first misalignment tracking RS and a second misalignment tracking RS for an OAM transmission. The example apparatus 1902 also includes means for transmitting, to the first communication device, the first misalignment tracking RS for the OAM transmission. The example apparatus 1902 also includes means for transmitting, to the first communication device, the second misalignment tracking RS for the OAM transmission.

In another configuration, the example apparatus 1902 also includes means for transmitting one or more repetitions of the first misalignment tracking RS and the second misalignment tracking RS to the first communication device.

In another configuration, the example apparatus 1902 also includes means for transmitting the first misalignment tracking RS at a first symbol and transmitting the second misalignment tracking RS at a second, consecutive symbol.

The means may be one or more of the components of the apparatus 1902 configured to perform the functions recited by the means. As described supra, the apparatus 1902 may include the TX processor 316, the RX processor 370, and the controller/processor 375. As such, in one configuration, the means may be the TX processor 316, the RX processor 370, and the controller/processor 375 configured to perform the functions recited by the means.

Aspects disclosed herein facilitate tracking and correcting misalignment of OAM transmissions. By tracking OAM transmissions, aspects disclosed herein provide techniques for a receiver to detect a misalignment of OAM transmissions. By correcting misalignment of OAM transmissions, aspects disclosed herein provide techniques for the transmitter and the receiver to improve communication performance by, for example, improving reliability.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a first communication device, comprising: receiving, from a second communication device, a first misalignment tracking RS and a second misalignment tracking RS for an OAM transmission; determining a misalignment based on the first misalignment tracking RS, the second misalignment tracking RS, and using a subset of antenna elements of an antenna array of the first communication device; and adjusting reception of a subsequent OAM transmission from the second communication device at the antenna array of the first communication device.

Aspect 2 is the method of aspect 1, further including that the first misalignment tracking RS comprises a first helical phase structure and the second misalignment tracking RS comprises a second helical phase structure.

Aspect 3 is the method of any of aspect 1 or aspect 2, further including that the second helical phase structure is based on an opposite rotational direction of the first helical phase structure.

Aspect 4 is the method of any of aspects 1 to 3, further including that the first misalignment tracking RS is based on a topological charge of m=1 and the second misalignment tracking RS is based on a topological charge of m=−1.

Aspect 5 is the method of any of aspects 1 to 4, further including that the subset of the antenna elements of the antenna array comprises at least three non-co-linear antenna elements.

Aspect 6 is the method of any of aspects 1 to 5, further including: receiving a repetition of the first misalignment tracking RS and the second misalignment tracking RS from the second communication device, where the first communication device determines the misalignment using the repetition.

Aspect 7 is the method of any of aspects 1 to 6, further including that the first misalignment tracking RS and the second misalignment tracking RS are separated in at least one of a time-domain and a frequency-domain.

Aspect 8 is the method of any of aspects 1 to 7, further including that the first communication device receives the first misalignment tracking RS at a first symbol and receives the second misalignment tracking RS at a second, consecutive symbol.

Aspect 9 is the method of any of aspects 1 to 8, further including that determining the misalignment comprises: measuring a first phase for each antenna element of the subset of the antenna elements based on the first misalignment tracking RS; measuring a second phase for each antenna element of the subset of the antenna elements based on the second misalignment tracking RS; and determining an angle relative to an optical center for each antenna element of the subset of the antenna elements based on the first phase and a conjugate of the second phase.

Aspect 10 is the method of any of aspects 1 to 9, further including: identifying the optical center based on the determined angle for each antenna element of the subset of the antenna elements and spatial coordinates for each antenna element of the subset of the antenna elements, where the misalignment corresponds to a displacement size and direction relative to the optical center for each antenna element of the subset of the antenna elements.

Aspect 11 is the method of any of aspects 1 to 10, further including that adjusting the reception of the subsequent OAM transmission further comprises: activating a second subset of the antenna elements of the antenna array based on the misalignment.

Aspect 12 is the method of any of aspects 1 to 11, further including that adjusting the reception of the subsequent OAM transmission further comprises: mechanically moving the antenna array relative to the second communication.

Aspect 13 is the method of any of aspects 1 to 12, further including that the first communication device comprises a user equipment and the second communication device comprises a base station.

Aspect 14 is the method of any of aspects 1 to 12, further including that the second communication device comprises a user equipment and the first communication device comprises a base station.

Aspect 15 is the method of any of aspects 1 to 12, further including that the first communication device comprises a first sidelink device and the second communication device comprises a second sidelink device.

Aspect 16 is the method of any of aspects 1 to 12, further including that at least one of the first communication device or the second communication device comprises an IAB node.

Aspect 17 is the method of any of aspects 1 to 16, further including that the first misalignment tracking RS comprises a first helical phase structure and is based on a topological charge of m=1, and the second misalignment tracking RS comprises a second helical phase structure and is based on a topological charge of m=−1.

Aspect 18 is the method of any of aspects 1 to 17, further including a transceiver.

Aspect 19 is an apparatus for wireless communication including a memory and at least one processor coupled to a memory, the memory and the at least one processor configured to implement a method as in any of aspects 1 to 18.

Aspect 20 is an apparatus for wireless communication including means for implementing a method as in any of aspects 1 to 18.

Aspect 21 is a non-transitory computer-readable storage medium storing computer executable code, where the code, when executed, causes a processor to implement a method as in any of aspects 1 to 18.

Aspect 22 is a method of wirelessly transmitting, to a first communication device, a reference signal from a second communication device, comprising: generating a first misalignment tracking RS and a second misalignment tracking RS for an OAM transmission; transmitting, to the first communication device, the first misalignment tracking RS for the OAM transmission; and transmitting, to the first communication device, the second misalignment tracking RS for the OAM transmission.

Aspect 23 is the method of aspect 22, further including that the first misalignment tracking RS comprises a first helical phase structure and the second misalignment tracking RS comprises a second helical phase structure.

Aspect 24 is the method of any of aspect 22 or aspect 23, further including that the second helical phase structure is based on an opposite rotational direction of the first helical phase structure.

Aspect 25 is the method of any of aspects 22 to 24, further including that the first misalignment tracking RS is based on a topological charge of m=1 and the second misalignment tracking RS is based on a topological charge of m=−1.

Aspect 26 is the method of any of aspects 22 to 25, further including: transmitting one or more repetitions of the first misalignment tracking RS and the second misalignment tracking RS to the first communication device.

Aspect 27 is the method of any of aspects 22 to 26, further including that the first misalignment tracking RS and the second misalignment tracking RS are separated in at least one of a time-domain and a frequency-domain.

Aspect 28 is the method of any of aspects 22 to 27, further including that the second communication device transmits the first misalignment tracking RS at a first symbol and transmits the second misalignment tracking RS at a second, consecutive symbol.

Aspect 29 is the method of any of aspects 22 to 28, further including that the second communication device comprises a base station and the first communication device comprises a user equipment.

Aspect 30 is the method of any of aspects 22 to 28, further including that the first communication device comprises a base station and the second communication device comprises a user equipment.

Aspect 31 is the method of any of aspects 22 to 28, further including that the first communication device comprises a first sidelink device and the second communication device comprises a second sidelink device.

Aspect 32 is the method of any of aspects 22 to 28, further including that at least one of the first communication device or the second communication device comprises an IAB node.

Aspect 33 is the method of any of aspects 22 to 32, further including that the first misalignment tracking RS comprises a first helical phase structure and is based on a topological charge of m=1, and the second misalignment tracking RS comprises a second helical phase structure and is based on a topological charge of m=−1.

Aspect 34 is the method of any of aspects 22 to 32, further including a transceiver.

Aspect 35 is an apparatus for wireless communication including a memory and at least one processor coupled to a memory, the memory and the at least one processor configured to implement a method as in any of aspects 22 to 34.

Aspect 36 is an apparatus for wireless communication including means for implementing a method as in any of aspects 22 to 34.

Aspect 37 is a non-transitory computer-readable storage medium storing computer executable code, where the code, when executed, causes a processor to implement a method as in any of aspects 22 to 34.

Aspect 38 is a method of wireless communication at a receiving device, comprising: receiving, from a transmitting device, a first misalignment tracking RS and a second misalignment tracking RS for an OAM transmission; determining a misalignment based on the first misalignment tracking RS, the second misalignment tracking RS, and using a subset of antenna elements of an antenna array of the receiving device; and adjusting reception of a subsequent OAM transmission from the transmitting device at the antenna array of the receiving device.

Aspect 39 is an apparatus for wireless communication including a memory and at least one processor coupled to a memory, the memory and the at least one processor configured to implement a method as in aspect 38.

Aspect 40 is an apparatus for wireless communication including means for implementing a method as in aspect 38.

Aspect 41 is a non-transitory computer-readable storage medium storing computer executable code, where the code, when executed, causes a processor to implement a method as in aspect 38.

Aspect 42 is a method of wirelessly transmitting, to a receiving device, a reference signal from a transmitting device, comprising: generating a first misalignment tracking RS and a second misalignment tracking RS for an OAM transmission; transmitting, to the receiving device, the first misalignment tracking RS for the OAM transmission; and transmitting, to the receiving device, the second misalignment tracking RS for the OAM transmission.

Aspect 43 is an apparatus for wireless communication including a memory and at least one processor coupled to a memory, the memory and the at least one processor configured to implement a method as in aspect 42.

Aspect 44 is an apparatus for wireless communication including means for implementing a method as in aspect 42.

Aspect 45 is a non-transitory computer-readable storage medium storing computer executable code, where the code, when executed, causes a processor to implement a method as in aspect 42.

What is claimed is:

1. An apparatus for wireless communication at a first communication device, comprising:
   a memory; and
   at least one processor coupled to the memory, the at least one processor configured to:
     receive, from a second communication device, a first misalignment tracking reference signal (RS) and a second misalignment tracking RS for an orbital angular momentum (OAM) transmission;
     determine a misalignment based on the first misalignment tracking RS, the second misalignment tracking RS, and using a subset of antenna elements of an antenna array of the first communication device; and
     adjust reception of a subsequent OAM transmission from the second communication device at the antenna array of the first communication device.

2. The apparatus of claim 1, wherein the first misalignment tracking RS comprises a first helical phase structure and the second misalignment tracking RS comprises a second helical phase structure.

3. The apparatus of claim 2, wherein the second helical phase structure is based on an opposite rotational direction of the first helical phase structure.

4. The apparatus of claim 2, wherein the first misalignment tracking RS is based on a first topological charge of m=1 and the second misalignment tracking RS is based on a second topological charge of m=−1.

5. The apparatus of claim 1, wherein the subset of the antenna elements of the antenna array comprises at least three non-co-linear antenna elements.

6. The apparatus of claim 1, wherein the at least one processor is further configured to:
   receive a repetition of the first misalignment tracking RS and the second misalignment tracking RS from the second communication device, and
   use the repetition to determine the misalignment.

7. The apparatus of claim 1, wherein the first misalignment tracking RS and the second misalignment tracking RS are separated in at least one of a time-domain and a frequency-domain.

8. The apparatus of claim 1, wherein the at least one processor is configured to:
   receive the first misalignment tracking RS at a first symbol, and
   receive the second misalignment tracking RS at a second, consecutive symbol.

9. The apparatus of claim 1, wherein to determine the misalignment, the at least one processor is configured to:
   measure a first phase for each antenna element of the subset of the antenna elements based on the first misalignment tracking RS;
   measure a second phase for each antenna element of the subset of the antenna elements based on the second misalignment tracking RS; and
   determine an angle relative to an optical center for each antenna element of the subset of the antenna elements based on the first phase and a conjugate of the second phase.

10. The apparatus of claim 9, wherein the at least one processor is further configured to:
    identify the optical center based on the angle for each antenna element of the subset of the antenna elements and spatial coordinates for each antenna element of the subset of the antenna elements,
    wherein the misalignment corresponds to a displacement size and direction relative to the optical center for each antenna element of the subset of the antenna elements.

11. The apparatus of claim 1, wherein to adjust the reception of the subsequent OAM transmission, the at least one processor is further configured to:
    activate a second subset of the antenna elements of the antenna array based on the misalignment.

12. The apparatus of claim 1, wherein to adjust the reception of the subsequent OAM transmission, the at least one processor is further configured to:

mechanically move the antenna array relative to the second communication device.

13. The apparatus of claim 1, wherein the first communication device comprises a user equipment and the second communication device comprises a base station, or the second communication device comprises the user equipment and the first communication device comprises the base station.

14. The apparatus of claim 1, wherein the first communication device comprises a first sidelink device and the second communication device comprises a second sidelink device.

15. The apparatus of claim 1, wherein at least one of the first communication device or the second communication device comprises an integrated access and backhaul (IAB) node.

16. The apparatus of claim 1, wherein the first misalignment tracking RS comprises a first helical phase structure and is based on a first topological charge of m=1, and the second misalignment tracking RS comprises a second helical phase structure and is based on a second topological charge of m=−1.

17. The apparatus of claim 1, further comprising a transceiver coupled to the at least one processor.

18. A method of wireless communication at a first communication device, comprising:
receiving, from a second communication device, a first misalignment tracking reference signal (RS) and a second misalignment tracking RS for an orbital angular momentum (OAM) transmission;
determining a misalignment based on the first misalignment tracking RS, the second misalignment tracking RS, and using a subset of antenna elements of an antenna array of the first communication device; and
adjusting reception of a subsequent OAM transmission from the second communication device at the antenna array of the first communication device.

19. The method of claim 18, wherein the first misalignment tracking RS comprises a first helical phase structure and the second misalignment tracking RS comprises a second helical phase structure.

20. The method of claim 18, further comprising:
receiving a repetition of the first misalignment tracking RS and the second misalignment tracking RS from the second communication device, and
using the repetition to determine the misalignment.

21. The method of claim 18, further comprising:
receiving the first misalignment tracking RS at a first symbol, and
receiving the second misalignment tracking RS at a second, consecutive symbol.

22. The method of claim 18, wherein determining the misalignment further comprises:
measuring a first phase for each antenna element of the subset of the antenna elements based on the first misalignment tracking RS;
measuring a second phase for each antenna element of the subset of the antenna elements based on the second misalignment tracking RS; and
determining an angle relative to an optical center for each antenna element of the subset of the antenna elements based on the first phase and a conjugate of the second phase.

23. The method of claim 18, wherein adjusting reception of the subsequent OAM transmission further comprises:

activating a second subset of the antenna elements of the antenna array based on the misalignment to adjust the reception.

24. The method of claim 18, wherein adjusting reception of the subsequent OAM transmission further comprises:
mechanically moving the antenna array relative to the second communication device.

25. An apparatus for wireless communication with a first communication device at a second communication device, comprising:
a memory; and
at least one processor coupled to the memory, the at least one processor configured to:
generate a first misalignment tracking reference signal (RS) and a second misalignment tracking RS for an orbital angular momentum (OAM) transmission;
transmit, at a first symbol to the first communication device, the first misalignment tracking RS for the OAM transmission; and
transmit, at a second, consecutive symbol to the first communication device, the second misalignment tracking RS for the OAM transmission.

26. The apparatus of claim 25, wherein the first misalignment tracking RS comprises a first helical phase structure and the second misalignment tracking RS comprises a second helical phase structure.

27. The apparatus of claim 26, wherein the second helical phase structure is based on an opposite rotational direction of the first helical phase structure.

28. The apparatus of claim 26, wherein the first misalignment tracking RS is based on a first topological charge of m=1 and the second misalignment tracking RS is based on a second topological charge of m=−1.

29. The apparatus of claim 25, wherein the at least one processor is further configured to:
transmit one or more repetitions of the first misalignment tracking RS and the second misalignment tracking RS to the first communication device.

30. The apparatus of claim 25, wherein the first misalignment tracking RS and the second misalignment tracking RS are separated in at least one of a time-domain and a frequency-domain.

31. The apparatus of claim 25, wherein the second communication device comprises a base station and the first communication device comprises a user equipment, or the first communication device comprises the base station and the second communication device comprises the user equipment.

32. The apparatus of claim 25, wherein the first communication device comprises a first sidelink device and the second communication device comprises a second sidelink device.

33. The apparatus of claim 25, wherein at least one of the first communication device or the second communication device comprises an integrated access and backhaul (IAB) node.

34. The apparatus of claim 25, further comprising a transceiver coupled to the at least one processor.

35. A method of wirelessly transmitting, to a first communication device, a reference signal from a second communication device, comprising:
generating a first misalignment tracking reference signal (RS) and a second misalignment tracking RS for an orbital angular momentum (OAM) transmission;
transmitting, at a first symbol to the first communication device, the first misalignment tracking RS for the OAM transmission; and transmitting, at a second, consecutive symbol to the first communication device, the second misalignment tracking RS for the OAM transmission.

36. The method of claim 35, wherein the first misalignment tracking RS comprises a first helical phase structure and the second misalignment tracking RS comprises a second helical phase structure.

37. The method of claim 35, further comprising:
transmitting one or more repetitions of the first misalignment tracking RS and the second misalignment tracking RS to the first communication device.

38. A non-transitory computer-readable storage medium comprising computer-executable code at a first communication device, the computer-executable code, when executed, causes a processor to:
receive, from a second communication device, a first misalignment tracking reference signal (RS) and a second misalignment tracking RS for an orbital angular momentum (OAM) transmission;
determine a misalignment based on the first misalignment tracking RS, the second misalignment tracking RS, and using a subset of antenna elements of an antenna array of the first communication device; and
adjust reception of a subsequent OAM transmission from the second communication device at the antenna array of the first communication device.

39. The non-transitory computer-readable storage medium of claim 38, wherein the first misalignment tracking RS comprises a first helical phase structure and the second misalignment tracking RS comprises a second helical phase structure.

40. The non-transitory computer-readable storage medium of claim 38, wherein the computer-executable code, when executed, further causes the processor to:
receive a repetition of the first misalignment tracking RS and the second misalignment tracking RS from the second communication device, and
use the repetition to determine the misalignment.

41. The non-transitory computer-readable storage medium of claim 38, wherein the computer-executable code, when executed, further causes the processor to:
receive the first misalignment tracking RS at a first symbol, and
receive the second misalignment tracking RS at a second, consecutive symbol.

42. The non-transitory computer-readable storage medium of claim 38, wherein the computer-executable code, when executed, further causes the processor to:
measure a first phase for each antenna element of the subset of the antenna elements based on the first misalignment tracking RS;
measure a second phase for each antenna element of the subset of the antenna elements based on the second misalignment tracking RS; and
determine an angle relative to an optical center for each antenna element of the subset of the antenna elements based on the first phase and a conjugate of the second phase.

43. The non-transitory computer-readable storage medium of claim 38, wherein the computer-executable code, when executed, further causes the processor to:
activate a second subset of the antenna elements of the antenna array based on the misalignment to adjust the reception.

44. The non-transitory computer-readable storage medium of claim 38, wherein the computer-executable code, when executed, further causes the processor to:
mechanically move the antenna array relative to the second communication device.

45. A non-transitory computer-readable storage medium comprising computer-executable code for wireless communication with a first communication device at a second communication device, the computer-executable code, when executed, causes a processor to:
generate a first misalignment tracking reference signal (RS) and a second misalignment tracking RS for an orbital angular momentum (OAM) transmission;
transmit, at a first symbol to the first communication device, the first misalignment tracking RS for the OAM transmission; and
transmit, at a second, consecutive symbol to the first communication device, the second misalignment tracking RS for the OAM transmission.

46. The non-transitory computer-readable storage medium of claim 45, wherein the first misalignment tracking RS comprises a first helical phase structure and the second misalignment tracking RS comprises a second helical phase structure.

47. The non-transitory computer-readable storage medium of claim 45, wherein the computer-executable code, when executed, further causes the processor to:
transmit one or more repetitions of the first misalignment tracking RS and the second misalignment tracking RS to the first communication device.

* * * * *